US006898691B2

(12) United States Patent
Blomgren et al.

(10) Patent No.: US 6,898,691 B2
(45) Date of Patent: May 24, 2005

(54) REARRANGING DATA BETWEEN VECTOR AND MATRIX FORMS IN A SIMD MATRIX PROCESSOR

(75) Inventors: James S. Blomgren, Austin, TX (US); Timothy A. Olson, Austin, TX (US); Christophe Harle, Austin, TX (US)

(73) Assignee: Intrinsity, Inc., Austin, TX (US)

( * ) Notice: Subject to any disclaimer, the term of this patent is extended or adjusted under 35 U.S.C. 154(b) by 478 days.

(21) Appl. No.: 10/164,040

(22) Filed: Jun. 6, 2002

(65) Prior Publication Data

US 2002/0198911 A1 Dec. 26, 2002

Related U.S. Application Data

(60) Provisional application No. 60/374,174, filed on Apr. 19, 2002, and provisional application No. 60/296,410, filed on Jun. 6, 2001.

(51) Int. Cl.[7] .............................................. G06F 15/80

(52) U.S. Cl. ........................................................ 712/10

(58) Field of Search ........................................... 712/10

(56) References Cited

U.S. PATENT DOCUMENTS

| | | | | |
|---|---|---|---|---|
| 5,541,914 A | * | 7/1996 | Krishnamoorthy et al. | 370/427 |
| 5,875,355 A | * | 2/1999 | Sidwell et al. | 712/300 |
| 6,003,056 A | * | 12/1999 | Auslander et al. | 708/404 |
| 6,115,812 A | * | 9/2000 | Abdallah et al. | 712/300 |
| 6,141,673 A | * | 10/2000 | Thayer et al. | 708/402 |
| 6,334,176 B1 | * | 12/2001 | Scales et al. | 712/4 |
| 6,366,937 B1 | * | 4/2002 | Shridhar et al. | 708/409 |
| 6,456,838 B1 | * | 9/2002 | Wang et al. | 370/380 |
| 6,470,441 B1 | * | 10/2002 | Pechanek et al. | 712/15 |
| 6,714,690 B1 | * | 3/2004 | Shimizu | 382/293 |

OTHER PUBLICATIONS

Hartenstein, R.; Coarse Grain Reconfigurable Architectures; Asia and South Pacific Design Automation Conference 2001; 1–30 through Feb. 2, 2001; Yokohama, Japan.

Taveniku, M.; Ahlander, A.; Jonsson, M.; and Svensson, B.; The VEGA Moderatly Parallel MIMD, Moderately Parallel SIMD, Architecture for High Performance Array Signal Processing; International Parallel Processing Symposium & Symposium on Parallel and Distributed Processing; 3–30 through Apr. 3, 1998, Orlando, Florida.

Miyamori, T. and Olukotun, K.; REMARC: Reconfigurable Multimedia Array Coprocessor, IEICE Transactions on Information and Systems E82–D, p. 389 through 397, 2–99.

Lu, G.; Lee, M.; Bagherzadeh, N.; Kuradhi, F.; and Filho, E.; The MorphoSys Parallel Reconfigurable System; in proceedings of Euro–Par 99, Toulouse, France, 9–99.

* cited by examiner

*Primary Examiner*—Eric Coleman
(74) *Attorney, Agent, or Firm*—Matthew J. Booth & Associates PLLC; Matthew J. Booth

(57) ABSTRACT

This invention discloses a group of instructions, block4 and block4v, in a matrix processor 16 that rearranges data between vector and matrix forms of an A×B matrix of data 120 where the data matrix includes one or more 4×4 sub-matrices of data 160–166. The instructions of this invention simultaneously swaps row or columns between the first 140, second 142, third 144, and fourth 146 matrix registers according to the instructions that perform predefined matrix tensor operations on the data matrix that includes one of the following group of operations: swapping rows between the different individual matrix registers, or swapping columns between the different individual matrix registers. Additionally, successive iterations or combinations of the block4 and or block4v instructions perform standard tensor matrix operations from the following group of matrix operations: transpose, shuffle, and deal.

13 Claims, 17 Drawing Sheets

| M0 |
|---|
| M1 |
| M2 |
| M3 |
| M4 |
| M5 |
| M6 |
| M7 |
| M8 |
| M9 |
| M10 |
| M11 |
| M12 |
| M13 |
| M14 |
| M15 |

| PE[0,0,M0] | PE[0,1,M0] | PE[0,2,M0] | PE[0,3,M0] |
|---|---|---|---|
| PE[1,0,M0] | PE[1,1,M0] | PE[1,2,M0] | PE[1,3,M0] |
| PE[2,0,M0] | PE[2,1,M0] | PE[2,2,M0] | PE[2,3,M0] |
| PE[3,0,M0] | PE[3,1,M0] | PE[3,2,M0] | PE[3,3,M0] |

FIG. 18B

| PE[0,0,M1] | PE[0,1,M1] | PE[0,2,M1] | PE[0,3,M1] |
|---|---|---|---|
| PE[1,0,M1] | PE[1,1,M1] | PE[1,2,M1] | PE[1,3,M1] |
| PE[2,0,M1] | PE[2,1,M1] | PE[2,2,M1] | PE[2,3,M1] |
| PE[3,0,M1] | PE[3,1,M1] | PE[3,2,M1] | PE[3,3,M1] |

FIG. 18C

| PE[0,0,M2] | PE[0,1,M2] | PE[0,2,M2] | PE[0,3,M2] |
|---|---|---|---|
| PE[1,0,M2] | PE[1,1,M2] | PE[1,2,M2] | PE[1,3,M2] |
| PE[2,0,M2] | PE[2,1,M2] | PE[2,2,M2] | PE[2,3,M2] |
| PE[3,0,M2] | PE[3,1,M2] | PE[3,2,M2] | PE[3,3,M2] |

FIG. 18D

| PE[0,0,M3] | PE[0,1,M3] | PE[0,2,M3] | PE[0,3,M3] |
|---|---|---|---|
| PE[1,0,M3] | PE[1,1,M3] | PE[1,2,M3] | PE[1,3,M3] |
| PE[2,0,M3] | PE[2,1,M3] | PE[2,2,M3] | PE[2,3,M3] |
| PE[3,0,M3] | PE[3,1,M3] | PE[3,2,M3] | PE[3,3,M3] |

REARRANGING DATA BETWEEN VECTOR AND MATRIX FORMS IN A SIMD MATRIX PROCESSOR

CROSS REFERENCE TO RELATED APPLICATIONS

This application claims the benefits of the earlier filed U.S. Provisional Application Ser. No. 60/296,410, filed 06, Jun. 2001 (Jun. 06, 2001), which is incorporated by reference for all purposes into this specification.

Additionally, this application claims the benefits of the earlier filed U.S. Provisional Application Ser. No. 60/374,174, filed 19 Apr. 2002 (Apr. 19, 2002), which is incorporated by reference for all purposes into this specification.

BACKGROUND OF THE INVENTION

1. Field of the Invention

The present invention relates to instructions for matrix operations in a microprocessor. More specifically, the present invention relates to instructions for matrix operations that operate on 2 and 3 dimensional representations of matrix data in a matrix processing engine.

2. Description of the Related Art

A Single Instruction, Multiple Data (SIMD) matrix processor can efficiently perform matrix-based computations by breaking large matrices up into smaller sub-matrices. Unfortunately, memory hierarchies usually only support memory accesses of contiguous bytes (a vector), rather than the 2-dimensional structured access required for a sub-matrix. The block4 and block4v instructions of this invention perform simultaneous rearrangement of data in four matrix registers, transforming the data between vector and matrix representations. This allows efficient conversion between the in-memory representation of an arbitrary A×B matrix and the sub-matrix size supported by the matrix processor. These conversion operations also can be applied to more general data shuffling problems such as FFT address reversal.

Many communications and signal-processing algorithms are based upon matrix computations such as matrix-matrix multiplication. These computations are most efficiently performed by partitioning arbitrarily-sized matrices into fixed-size sub-matrices, and then performing the computations using those sub-matrices as basic computation units.

A matrix processor with 16 identical processing elements can be arranged in a 2-dimensional array that additionally matches the size of a 4×4 sub-matrix. The processing elements are connected with a row-and-column mesh network to directly perform matrix computations on the sub-matrices. Each processing element has a set of registers, with each register holding a corresponding element of a sub-matrix, which is based upon the position of the processing element in the row/column mesh. The individual register files, taken together, form a set of matrix registers, each holding an 4×4 sub-matrix.

In memory, an arbitrarily-sized A×B matrix comprises A rows of B contiguous elements (a vector of size B), with the address of each row beginning at an offset of B elements from the previous row. If this A×B matrix is partitioned into 4×4 sub-matrices, each sub-matrix comprises four rows of four contiguous elements (a vector of size 4), with the address of each row beginning at an offset of B elements from the previous row.

Since memory systems (including caches) are normally designed to transfer a contiguous set of bytes for each request, transferring a 4×4 sub-matrix directly between memory and a matrix register requires four independent memory operations. This either requires four sequential accesses, or a multi-ported memory that can handle four requests simultaneously.

To reduce the number of independent memory transfers and improve performance, this invention transfers four vectors of length 16 (4×4) between memory and the four matrix registers. This invention then simultaneously rearranges the vector data in those four matrix registers into four 4×4 sub-matrices using the block and or block4v instruction. The block4 and block4v instructions of this invention are found in the FASTMATH ADAPTIVE SIGNAL PROCESSOR matrix computing engine that is developed by Intrinsity, Inc., the assignee of this invention.

SUMMARY OF THE INVENTION

This invention discloses a group of instructions, block4 and block4v, in a matrix processor 16 that rearranges data between vector and matrix forms of an A×B matrix of data 120 where the data matrix includes one or more 4×4 sub-matrices of data 160–166 The matrix processor 16 comprises 16 processing elements 40–70 where an individual processing element (PE) 80 comprises 16 PE register entries M0–M15 in a PE register file 96. A mesh row column interconnect 72 couples the processing elements into a 4×4 matrix processing array. The matrix processor 16 includes 16 matrix registers, and includes a group of those matrix registers, the first 140, second 142, third 144, and fourth 146 matrix register for matrix operations. An individual matrix register is a combination of register entries that includes an individual PE register entry from each PE register file from each individual processing element in the matrix processor that are then combined together.

The block4 and block4v instructions of this invention simultaneously swaps row or columns between a group of matrix registers that includes a first 140, second 142, third 144, and fourth 146 matrix register according to the instructions that perform predefined matrix tensor operations on the data matrix that includes one of the following group of operations: swapping rows between the different individual matrix registers of the group, or swapping columns between the different individual matrix registers of the group. Additionally, the swapping of rows or columns converts the data in the data matrix into one of the following matrix data orders: 4 vectors of the larger data matrix to a 4×4 data sub-matrix in row major order, and 4 vectors of the larger data matrix to a 4×4 data sub-matrix in column major order. And finally, successive iterations or combinations of the block4 and or block4v instructions perform standard tensor matrix operations from the following group of matrix operations: transpose, shuffle, and deal.

DESCRIPTION OF THE DRAWINGS

To further aid in understanding the invention, the attached drawings help illustrate specific features of the invention and the following is a brief description of the attached drawings:

FIG. 4 shows the layout of a A×B matrix in memory.

FIG. 15 illustrates the manipulation of matrix data performed by one or more instructions/operations of this invention.

FIG. 17 is a block diagram of a register file in a processing element.

FIG. 18A, FIG. 18B, FIG. 18C, and FIG. 18D are block diagrams of 4 matrix registers showing the one to one mapping of the register entries in the processing elements to the matrix registers.

DETAILED DESCRIPTION OF THE INVENTION

Figure 1:
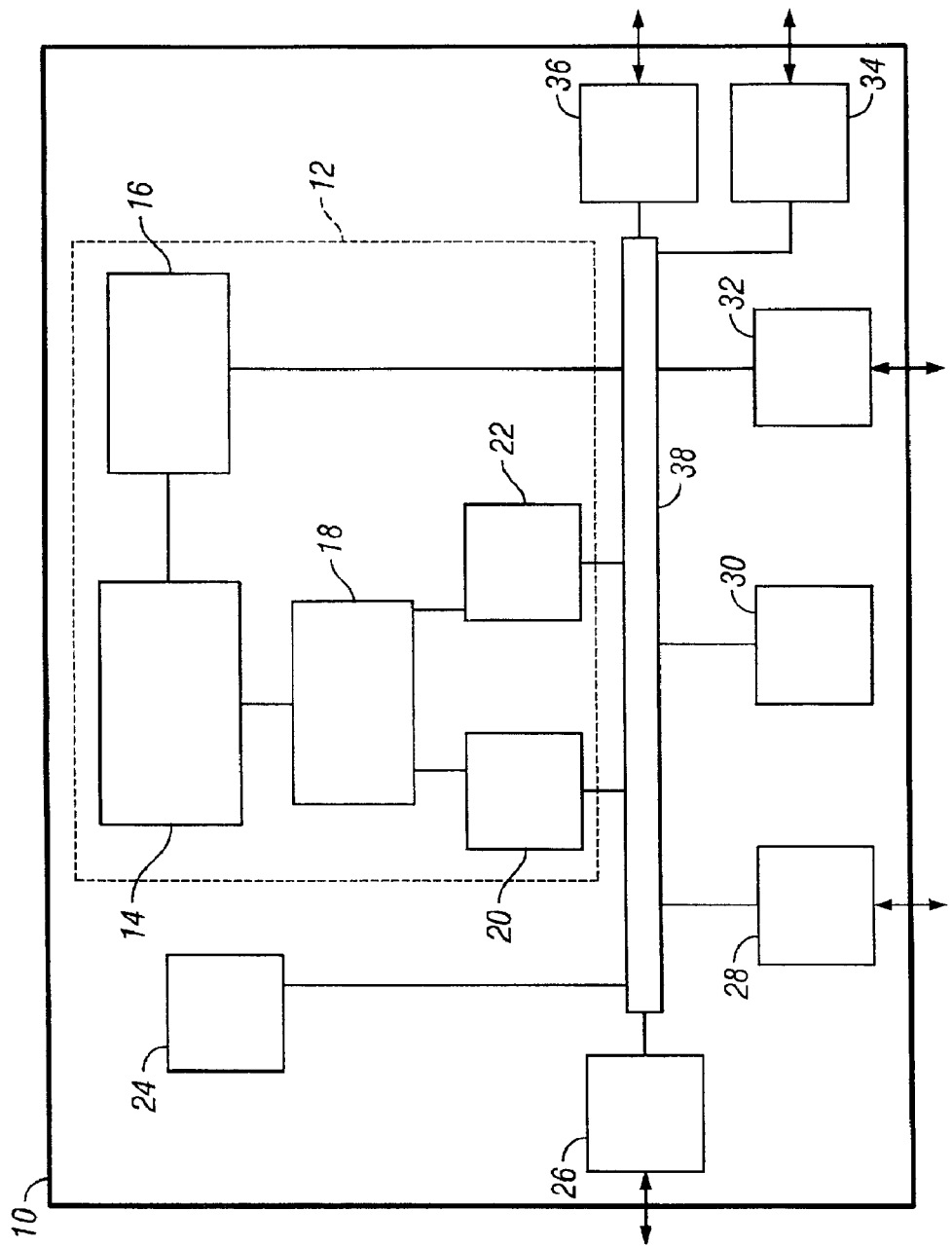
FIG. 1 is a block diagram of the FASTMATH ADAPTIVE SIGNAL PROCESSOR microprocessor engine.

The present invention is a method and apparatus for rearranging data between vector and matrix forms in a SIMD matrix processor. This disclosure describes numerous specific details that include specific architectural features, structures, circuits, and matrix operations in order to provide a thorough understanding of the present invention. For example, the present invention describes microprocessor architectures including matrix co-processing engines and matrix operations. However, the practice of the present invention also includes microprocessor architectural structures other than the previously described ones such as TLB's, DMA controllers, and L1/L2 caches. One skilled in the art will appreciate that one may practice the present invention without these specific details.

This invention discloses a group of instructions, block4 and block4v, in a matrix processor 16 that rearranges data between vector and matrix forms of an A×B matrix of data 120 where the data matrix includes one or more 4×4 sub-matrices of data 160–166 The instructions of this invention simultaneously swaps row or columns between the first 140, second 142, third 144, and fourth 146 matrix registers according to the instructions that perform predefined matrix tensor operations on the data matrix that includes one of the following group of operations: swapping rows between the different individual matrix registers, or swapping columns between the different individual matrix registers. The preferred embodiment of this invention uses the block4/block4v instruction for conversion between 4 1×16 vectors and 4 4×4 sub-matrices, which addresses how to create sub-matrices out of an external memory representation. However, there are more uses for these instructions because this invention is also applicable to solving more general 4-way interleave operations. For example, successive iterations or combinations of the block4 and or block4v instructions perform standard tensor matrix operations from the following group of matrix operations: transpose, shuffle, and deal. Additionally, this invention is also suitable for solving matrix problems such as Fast Fourier Transforms, Discrete Cosine Transforms, address reversals.

This invention is best illustrated by reference to FIG. 1 that shows a block diagram of the FASTMATH ADAPTIVE SIGNAL PROCESSOR microprocessor engine by Intrinsity, Inc., the assignee of this disclosure. The main computational component of the FASTMATH ADAPTIVE SIGNAL PROCESSOR microprocessor engine 10 is a microprocessor core 12 that includes a MIPS32 CPU 14, which is based on the MIPS32 Instruction Set Architecture (ISA) and a matrix co-processor or engine 16 (developed by Intrinsity, Inc.) that is optimized for matrix and vector operations. The matrix co-processor 16 is implemented as a coprocessor (CP2) to the MIPS core. The core 12 also includes a TLB 18 that couples to the CPU 14. The caches, an L1 Instruction cache 20 and an L1 data cache 22, couple to the TLB 18. And finally, the core 14 couples via the caches 20, 22 and the matrix co-processor 16 to a high speed internal bus 38.

The microprocessor engine 10 includes the high speed internal bus 38, which allows the core to communicate with a variety of other devices such as a DMA controller 24. Bus 38 also couples to an L2 cache 30, which also couples to external memory. And, finally bus 38 couples to a variety devices for external communications such as a dual RAPIDIO ports 26 and 36, a GPIO port 28, a SDRAM controller 32, and a Debug port 34.

Figure 2:
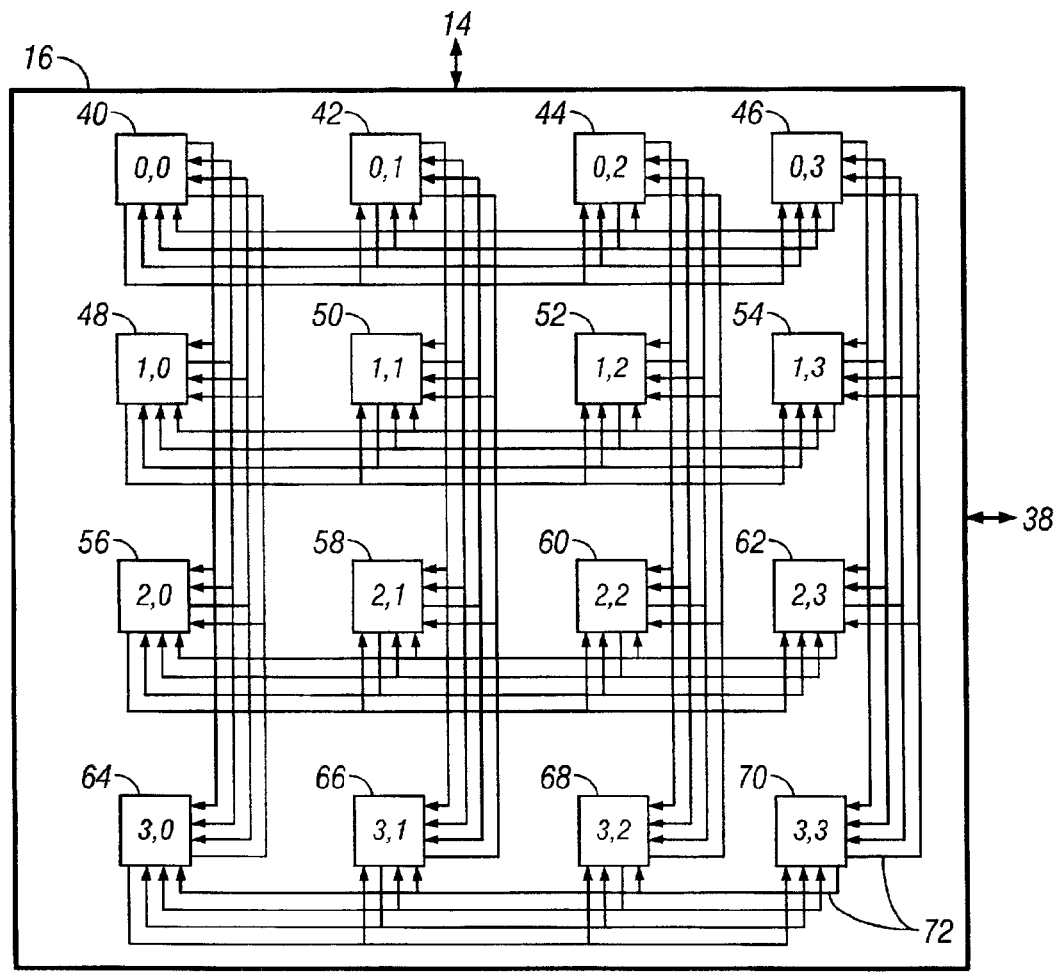
FIG. 2 is a block diagram of a 4×4 matrix processor with a row/column interconnect mesh.

FIG. 2 is a block diagram of the matrix processor 16 with a row column interconnect mesh 72. The matrix processor 16 couples to the CPU 14 and the high speed internal bus 38. The matrix processor 16 comprises 16 identical processing elements arranged in a 4×4 array or matrix. The 4×4 arrangement of the processing elements allow this invention to efficiently perform matrix computations on 4×4 sub-matrices. In addition to operating as a 4×4 array for matrix operations, the present invention can also operate as a 1×16 vector of PEs for vector operations. Additionally, and from a functional and logical aspect, the matrix processor 16 has 16 matrix registers with each matrix register containing a 4×4 matrix of register entries. As will be discussed below, the matrix registers are a logical implementation of register entries in the individual PEs that are combined together to form the logical matrix registers. The operations performed by the matrix unit 16 of this invention include: load/store matrix or vector, select, select row, select column, transpose, shift row/column, matrix multiply, sum row, sum column, and block rearrangement operation.

As illustrated, FIG. 2 describes each PE as part of the 4×4 array by its row, column index. Thus, the 16 processing elements (PEs) include: Processor Element (PE) (0,0) 40, Processor Element (PE) (0,1) 42, Processor Element (PE) (0,2) 44, Processor Element (PE) (0,3) 46, Processor Element (PE) (1,0) 48, Processor Element (PE) (1,1) 50, Processor Element (PE) (1,2) 52, Processor Element (PE) (1,3) 54, Processor Element (PE) (2,0) 56, Processor Element (PE) (2,1) 58, Processor Element (PE) (2,2) 60, Processor Element (PE) (2,3) 62, Processor Element (PE) (3,0) 64, Processor Element (PE) (3,1) 66, Processor Element (PE) (3,2) 68, Processor Element (PE) (3,3) 70.

The matrix unit 16 is fed from the instruction stream executing in the control core 14. It is directly coupled to the on-chip L2 cache 30 (via the high speed internal bus 38) in order to provide for the matrix unit's high bandwidth requirements. From a pipeline perspective, the matrix processor 16 is located late in the pipe such that a matrix operation immediately following a matrix load that hits in the L2 cache will experience no data dependency stalls because all load and store address calculations for the matrix load/store instructions is performed by the control processor 14. Thus, the matrix processor 16 only deals with data moving in and out of its register file(s) (as will be discussed below, these are actually part of the register files of the individual PEs).

The row column mesh interconnect 72 is optimized for matrix arithmetic operations. Mesh based architectures arrange their processing elements in a rectangular 2-D array with horizontal and vertical (row/column) connections that supports rich communication resources for efficient parallelism. Thus, each PE in the matrix unit 16 can broadcast a value to all the other elements in its row and column. Additionally, each element in the matrix unit can use register or broadcast as operands in any operation. One aspect of the matrix unit is that it operates as a 3D array of functional units by the logical stacking of the matrix registers, which provides the matrix unit the third dimensional operations, thus, the matrix unit extends standard matrix operations (2D operations) to tensor matrix operations (3D operations).

Figure 3:
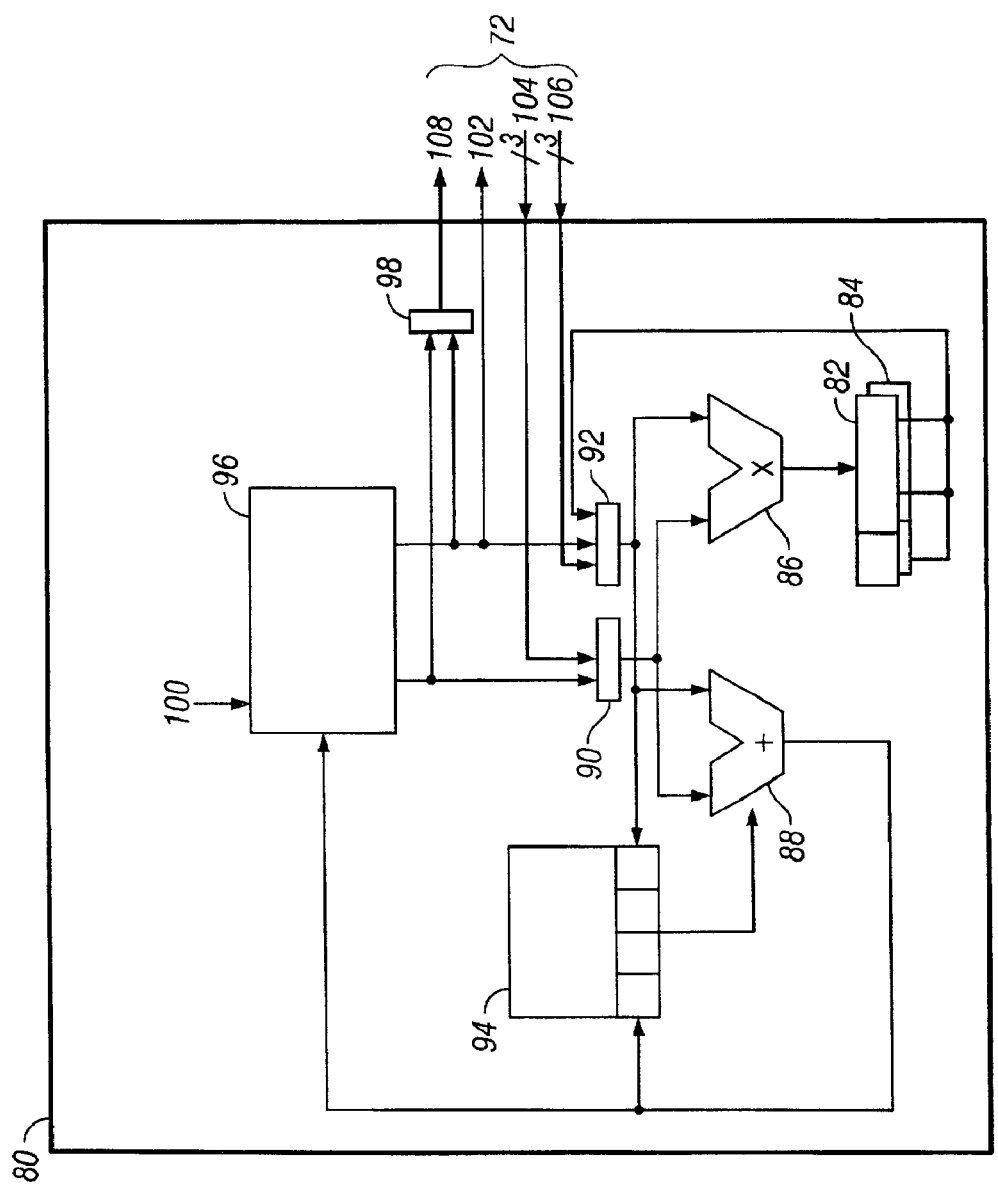
FIG. 3 is a block diagram of one element of the matrix processor.

FIG. 3 is a block diagram of one processing element (PE) 80 of the matrix processor. The PE 80 includes a 16-entry, 32-bit register file 96 that includes (as illustrated in FIG. 17) the following register entries: M0, M1, M2, M3, M4, M5, M6, M7, M8, M9, M10, M11, M12, M13, M14, and M15. Coupled to the register file 96 is the row/column mesh broadcast stage that includes: transmit row/column multiplexer 98, load signal pathway 100, transmit row/column signal pathway 108, store signal pathway 102, receive row/column signal pathway 104 from the mesh interconnect 72, and receive row/column signal pathway 106 from the mesh interconnect 72.

The PE 80 also includes a 32-bit integer ALU 88 that can also operate on packed 16-bit data, and includes a 16 bit×16 bit pipelined multiplier (an integer multiply accumulate) unit 86. The ALU 88 includes the following operations: add, subtract, Boolean, shift, compare. The ALU 88 and the multiplier 86 couple to the register 96 via multiplexer MX0 90 and multiplexer MX1 92. Additionally, the ALU and the multiplier couple to the condition code register 94. And finally, the multiplier 86 and multiplexer 92 also couple to two independent 40 bit accumlators, MA0 82 and MA1 84.

FIG. 18A, FIG. 18B, FIG. 18C, and FIG. 18D are block diagrams of 4 of the matrix unit's 16 logical matrix registers that shows the one to one mapping of the individual register entries in the 16 processing elements to the register entries within each logical matrix register. Another way of describing this is that each register file in each processing element holds a corresponding element of a matrix register (which is itself a 4×4 sub-matrix) based upon the position of the processing element in the row/column mesh. Thus, matrix register 140 (also known as matrix register 0) comprises the M0 register entry in each of the 16 PEs, PE[0,0] to PE[3,3]. Matrix register 142 (also known as matrix register 1) comprises the M1 register entry in each of the 16 PEs, PE[0,0] to PE[3,3]. Matrix register 144 (also known as matrix register 2) comprises the M2 register entry in each of the 16 PEs, PE[0,0] to PE[3,3]. And finally, matrix register 146 (also known as matrix register 3) comprises the M3 register entry in each of the 16 PEs, PE[0,0] to PE[3,3]. The remaining logical matrix registers have the same one to one mapping to the individual register entries in the 16 PEs as just illustrated.

Figure 4:
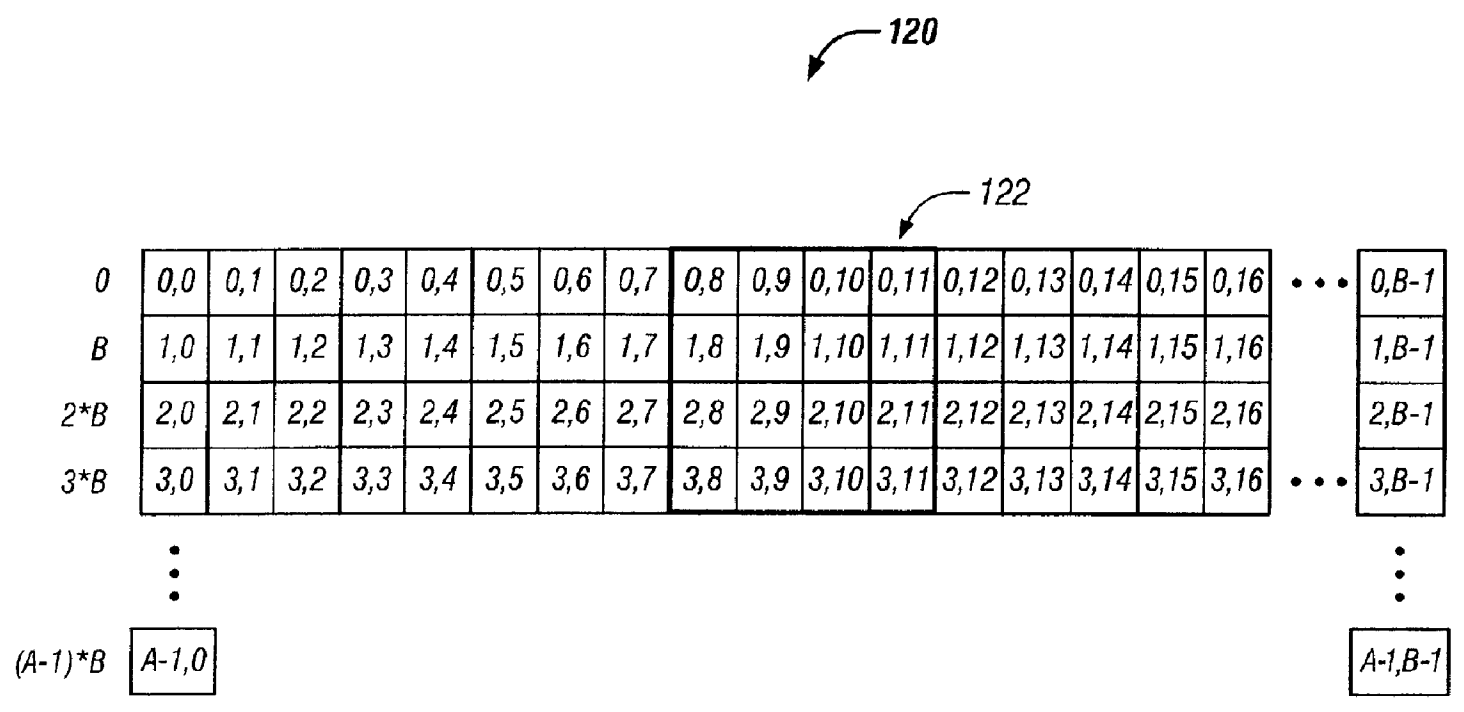

FIG. 4 shows the memory layout of an arbitrarily sized A×B data matrix 120 stored in external memory in row major order 120. The A×B matrix comprises A rows of B contiguous elements (a vector of size B), with the address of each row beginning at an offset of B elements from the previous row. If this A×B matrix is partitioned into 4×4 sub-matrices, such as 4×4 sub-matrix 122, each sub-matrix would comprise four rows of four contiguous elements (a vector of size 4), with the address of each row beginning at an offset of B elements from the previous row.

Figure 5:
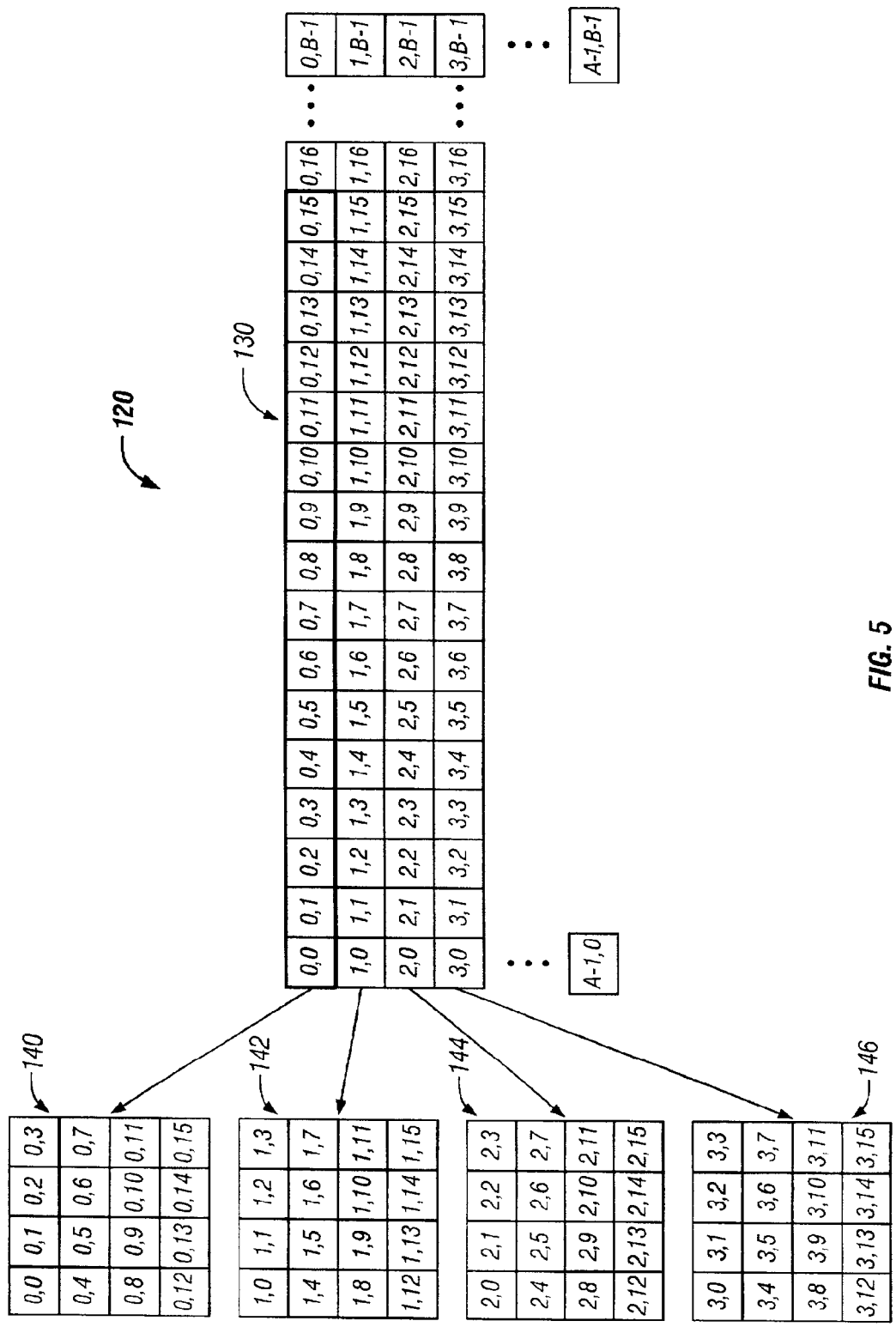
FIG. 5 shows the result of loading 4 matrix registers from memory.

FIG. 5 illustrates the A×B matrix 120 with a 1×16 vector 130. The FASTMATH unit 10 improves performance from past microprocessors and reduces the number of independent memory transfers by transferring four 1×16 vectors from external memory to 4 matrix registers of the matrix unit 16. FIG. 5 shows the following transfers: vector 130 to matrix register (MR1) 140, the vector of offset 1B to vector 130 to matrix register (MR2) 142, the vector of offset 2B to vector 130 to matrix register (MR3) 144, and the vector of offset 3B to vector 130 to matrix register (MR4) 146. Once loaded into the matrix registers, this invention uses the block4 and block4v instructions to simultaneously re-arrange the data into four 4×4 sub-matrices.

One way of thinking of the block4 and block4v instructions of this invention is that they operate on a set of 4 registers to convert 4 slices of a larger matrix into 4 4×4 matrices. Applying the instruction (block4 or block4v) twice will return the matrix registers to their original values.

Figure 6:
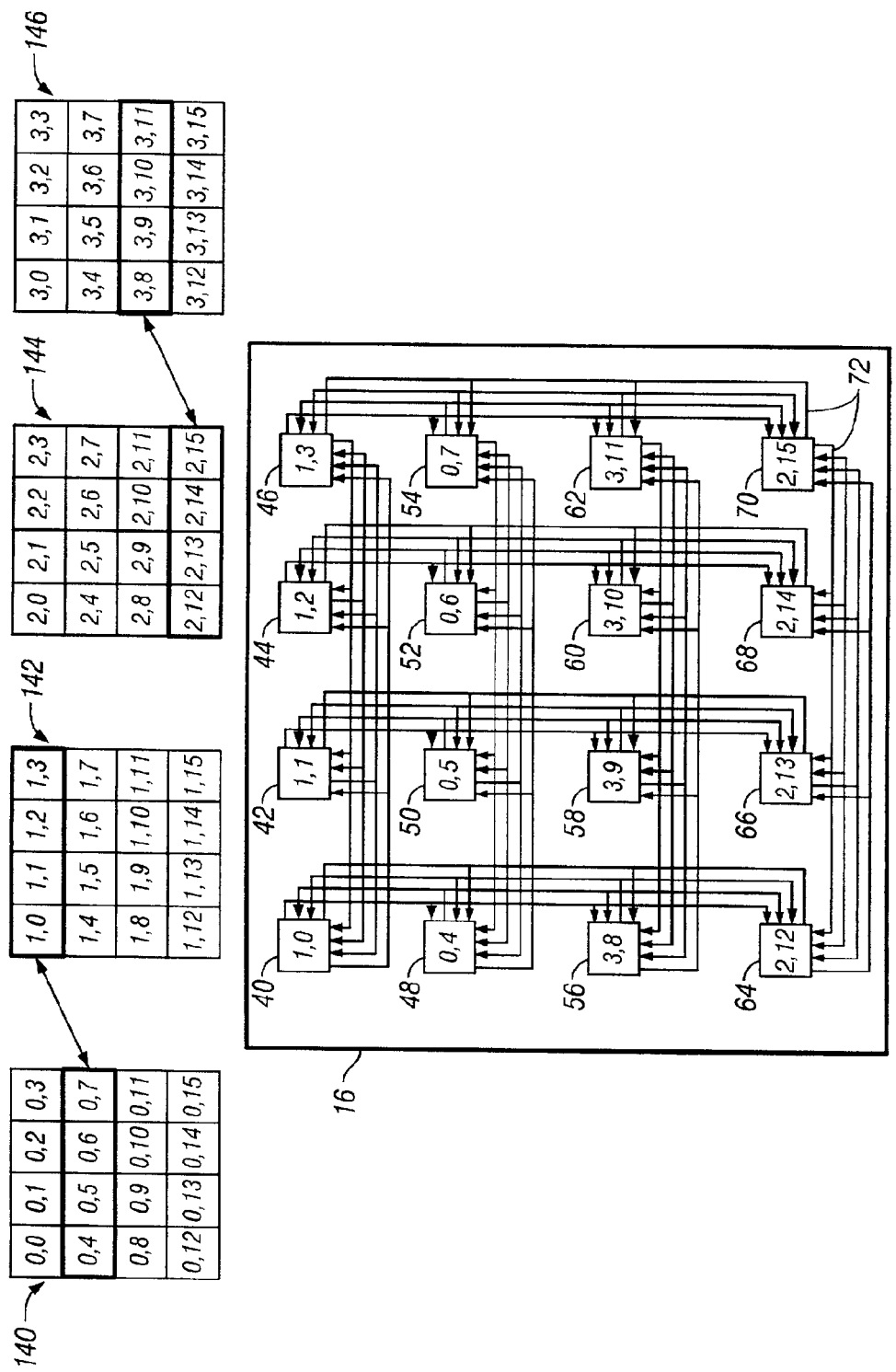
FIG. 6 shows step 1 of the block4 instruction.

FIG. 6 starts the illustration of the operation of the block4 instruction of this invention. The block4 instruction is implemented on 4 contiguous matrix registers and exchanges row data between the four matrix registers 140, 142, 144, and 146 in 3 steps. In step 1, the block4 operation swaps matrix register 140, row 1 with matrix register 142, row 0; and matrix register 144, row 3 with matrix register 146, row 2. This to exchange is performed by simultaneously having the row 0 elements of the matrix processor 16 broadcast their corresponding values from matrix register 142, row 1 elements broadcast from matrix register 140, row 2 elements broadcast from matrix register 146, and row 3 elements broadcast from matrix register 144. Then the row 0 elements read values from the row 1 broadcast port and write to matrix register 140, row 1 elements read values from the row 0 broadcast port and write to matrix register 142, row 2 elements read values from the row 3 broadcast port and write to matrix register 144, and row 3 elements read values from the row 2 broadcast port and write to matrix register 146.

Figure 7:
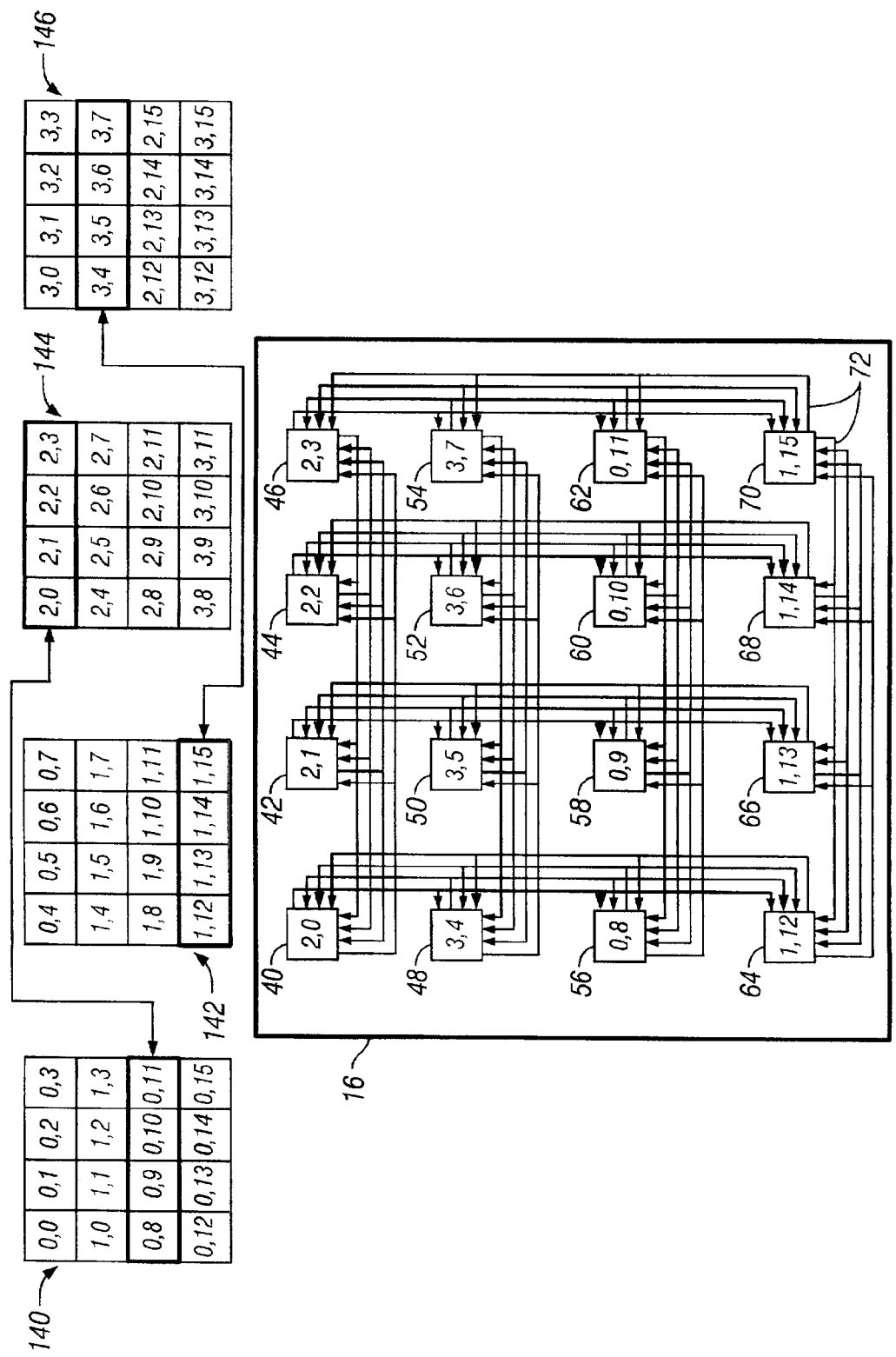
FIG. 7 shows step 2 of the block4 instruction.

FIG. 7 shows step 2 of the block4 instruction where the block4 operation swaps matrix register 140, row 2 with matrix register 144, row 0; and matrix register 142, row 3 with matrix register 146, row 1. This is performed by simultaneously having the row 0 elements of the matrix processor 16 broadcast their corresponding values from matrix register 144, row 1 elements broadcast from matrix register 146, row 2 elements broadcast from matrix register 140, and row 3 elements broadcast from matrix register 142. Then the row 0 elements read values from the row 2 broadcast port and write to matrix register 140, row 1 elements read values from the row 3 broadcast port and write to matrix register 142, row 2 elements read values from the row 0 broadcast port and write to matrix register 144, and row 3 elements read values from the row 1 broadcast port and write to matrix register 146.

Figure 8:
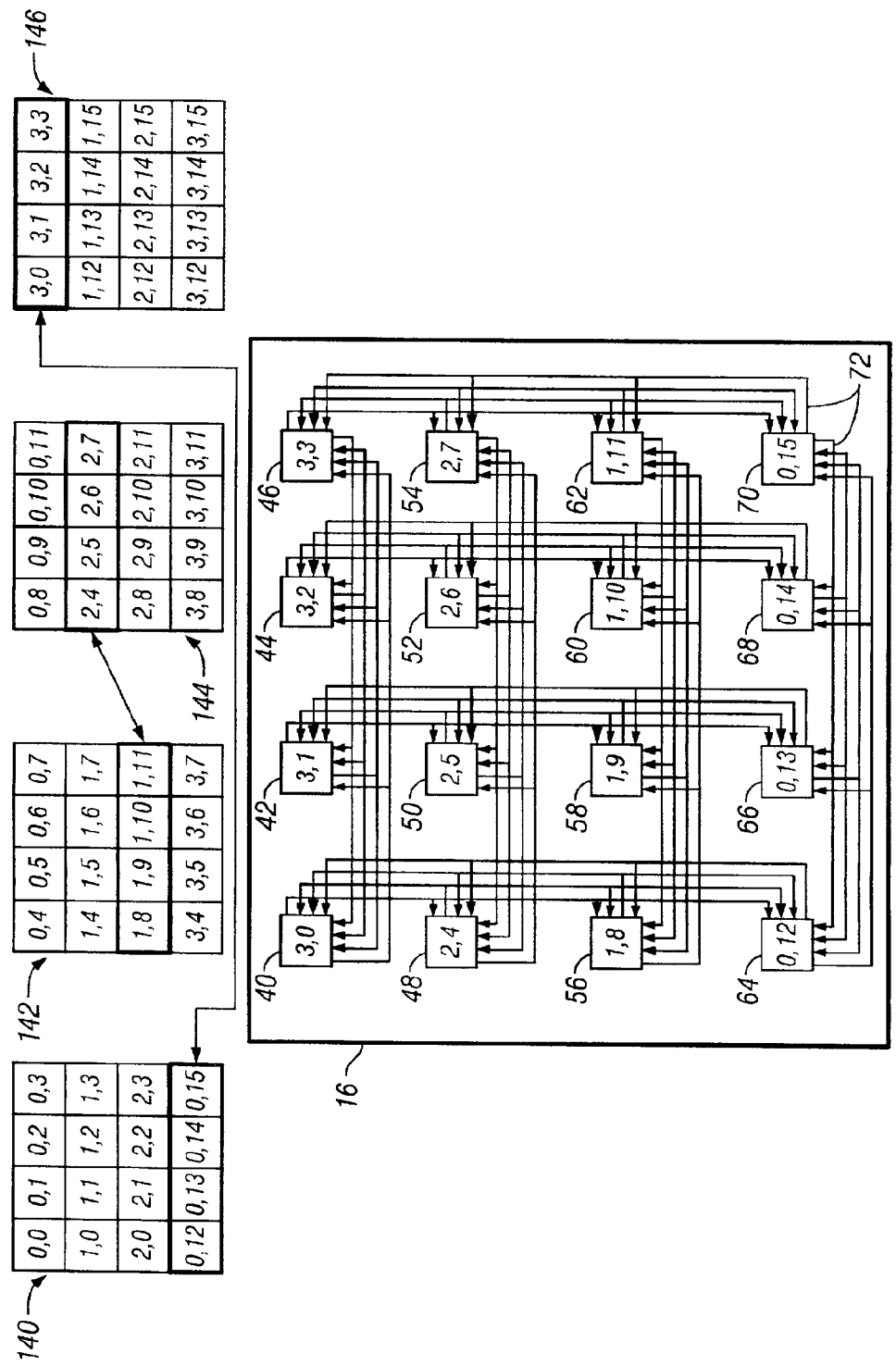
FIG. 8 shows step 3 of the block4 instruction.

FIG. 8 shows step 3 of the block4 instruction where the block4 operation swaps matrix register 140, row 3 with matrix register 146, row 0; and matrix register 142, row 2 with matrix register 144, row 1. This is performed by simultaneously having the row 0 elements of the matrix processor 16 broadcast their corresponding values from matrix register 146, row 1 elements broadcast from matrix register 144, row 2 elements broadcast from matrix register 142, and row 3 elements broadcast from matrix register 140. Then the row 0 elements read values from the row 3 broadcast port and write to matrix register 140, row 1 elements read values from the row 2 broadcast port and write to matrix register 142, row 2 elements read values from the row 1 broadcast port and write to matrix register 144, and row 3 elements read values from the row 0 broadcast port and write to matrix register 146.

Figure 9:
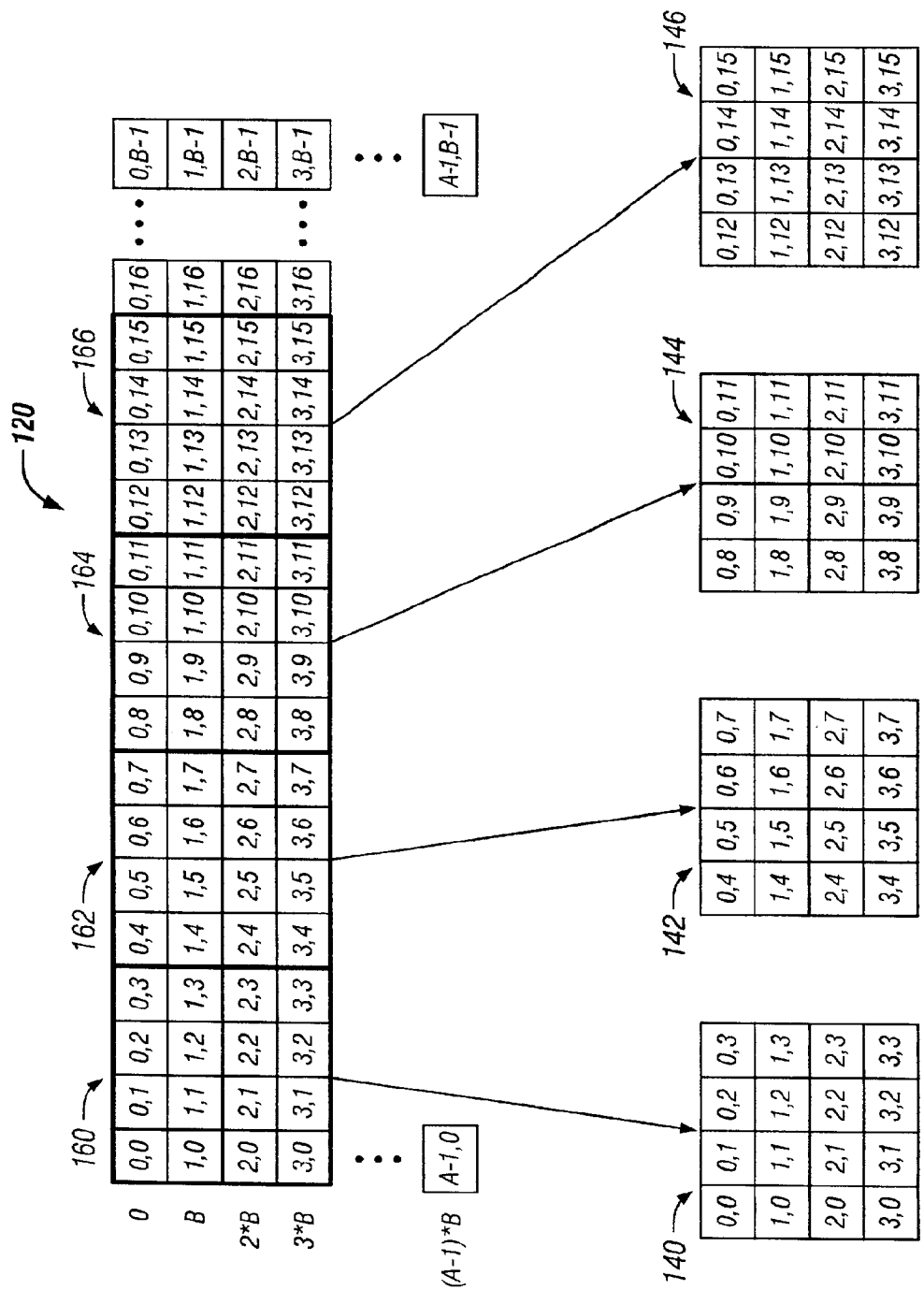
FIG. 9 shows the final state of the matrix registers after the block4 instruction.

FIG. 9 shows the final state of the matrix registers 140, 142, 144, and 146 at the end of the block4 operation. Here, the contents of the four matrix registers have been rearranged from four 1×16 vectors (at the beginning of the swapping) to four contiguous 4×4 sub-matrices, as illustrated by the 4×4 sub-matrices 160, 162, 164, and 166 in A×B matrix 120. Since all of the matrix data rearrangement is based upon swap operations, the block4 operation is reversible by performing another block4 operation, which converts from the four 4×4 sub-matrix representation to the four 1×16 vector representation, which is suitable for storing back to memory.

Figure 10:
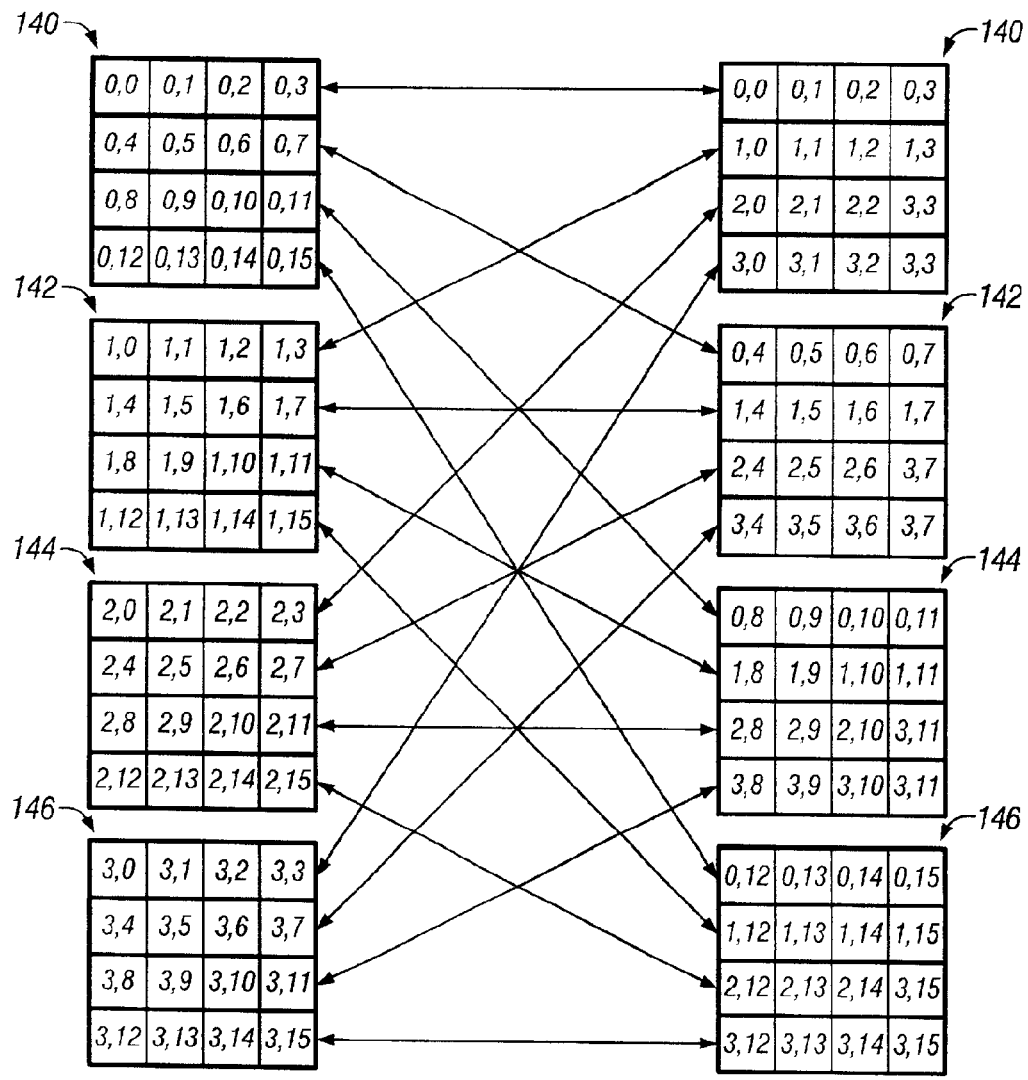
FIG. 10 shows the block4 instruction as a 4-way interleave of matrix rows.

FIG. 10 is another illustration that shows all of the row swap operations performed by the block4 instruction. Column A represents the data at the start of the instruction in matrix registers 140, 142, 144, and 146, and column B represents the data at the end of the instruction in matrix registers 140, 142, 144, and 146. This illustration shows that the block4 instruction can more generally be seen as a 4-way interleave of matrix rows from four matrix registers.

Figure 11:
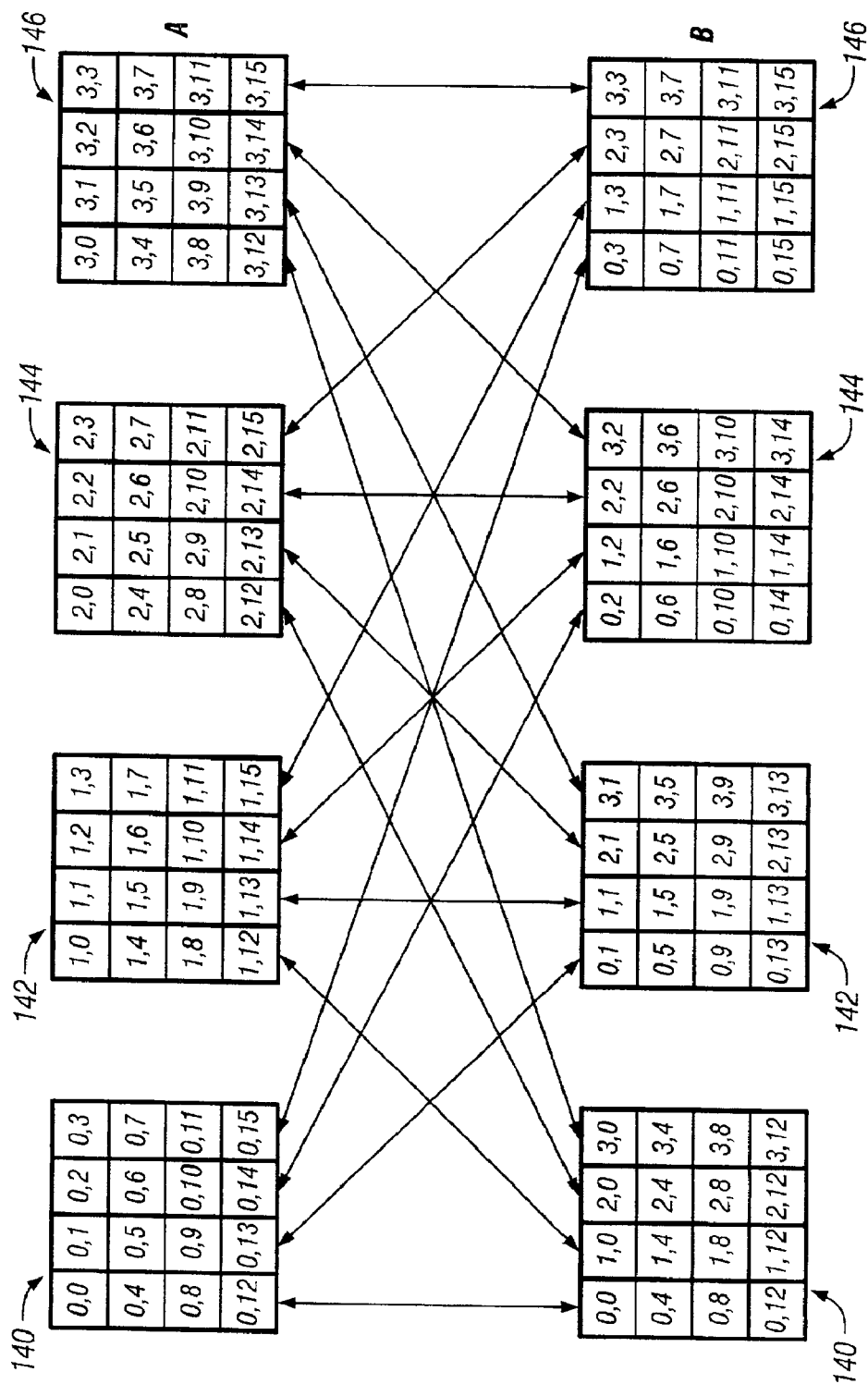
FIG. 11 shows the block4v instruction as a 4-way interleave of matrix columns.

The block4v instruction of this invention is similar to the block4 instruction except that it operates on swapping columns instead of rows. FIG. 11 shows all of the row swap operations performed by the block4v instruction. Row A represents the data at the start of the instruction in matrix registers 140, 142, 144, and 146, and row B represents the data at the end of the instruction in matrix registers 140, 142, 144, and 146. This illustration shows that the block4v instruction can more generally be seen as a 4-way interleave of matrix columns from four matrix registers.

Figure 12:
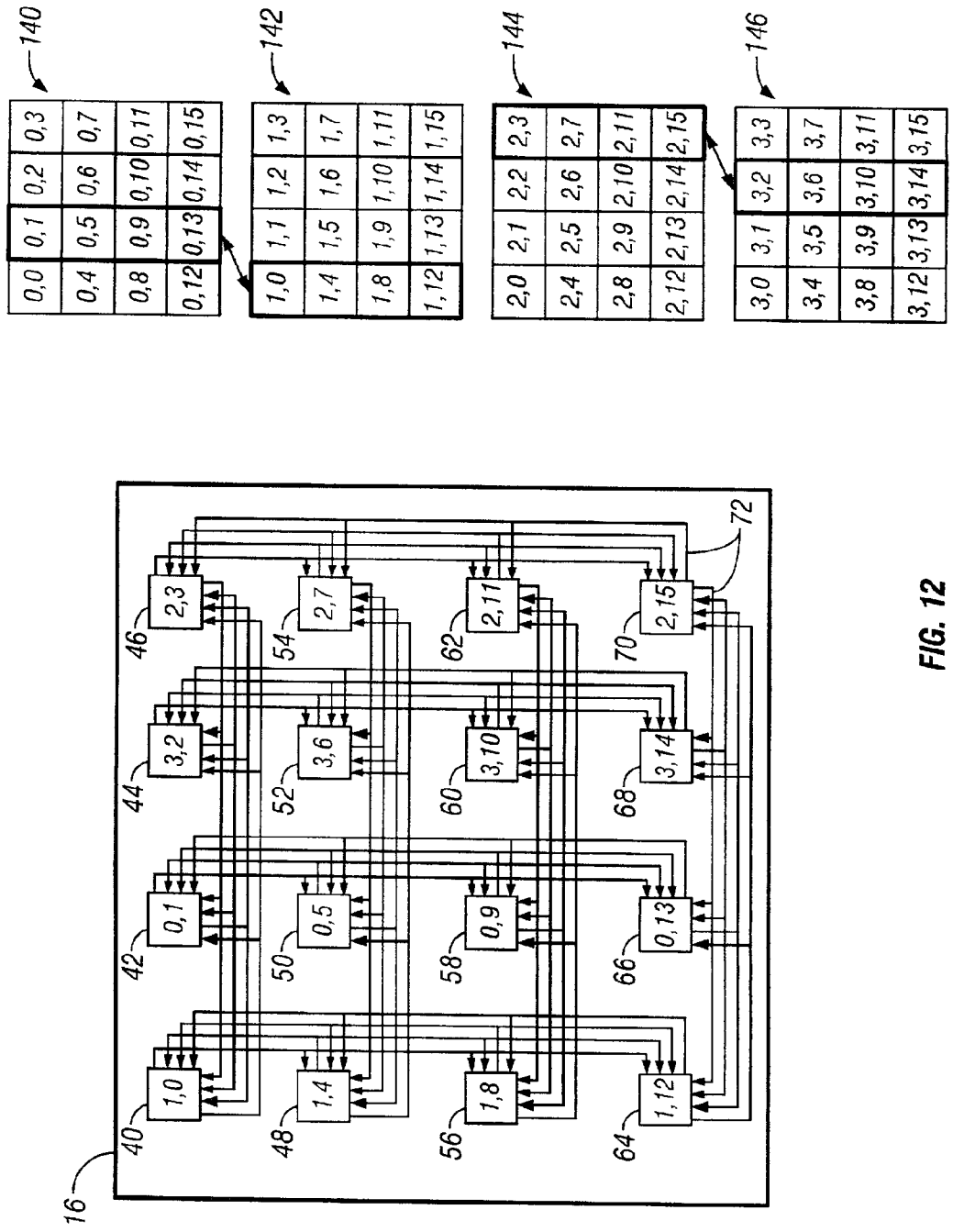
FIG. 12 shows step 1 of the block4v instruction.

FIG. 12 starts the illustration of the operation of the block4v instruction of this invention. The block4v instruction is implemented on 4 interleaved matrix registers and exchanges column data between the four matrix registers 140, 142, 144, and 146 in 3 steps. In step 1, the block4v operation swaps matrix register 140, column 1 with matrix register 142, column 0; and matrix register 144, column 3 with matrix register 146, column 2. This exchange is performed by simultaneously having the column 0 elements of the matrix processor 16 broadcast their corresponding values from matrix register 142, column 1 elements broadcast from matrix register 140, column 3 elements broadcast from matrix register 144, and column 2 elements broadcast from matrix register 146. Then the column 0 elements read values from the column 1 broadcast and write to matrix register 140, the column 1 elements read values from column 0 broadcast and write to matrix register 142, the column 2 elements read values from column 3 broadcast and write to matrix register 144, and the column 3 elements read values from column 2 broadcast and write to matrix register 146.

Figure 13:
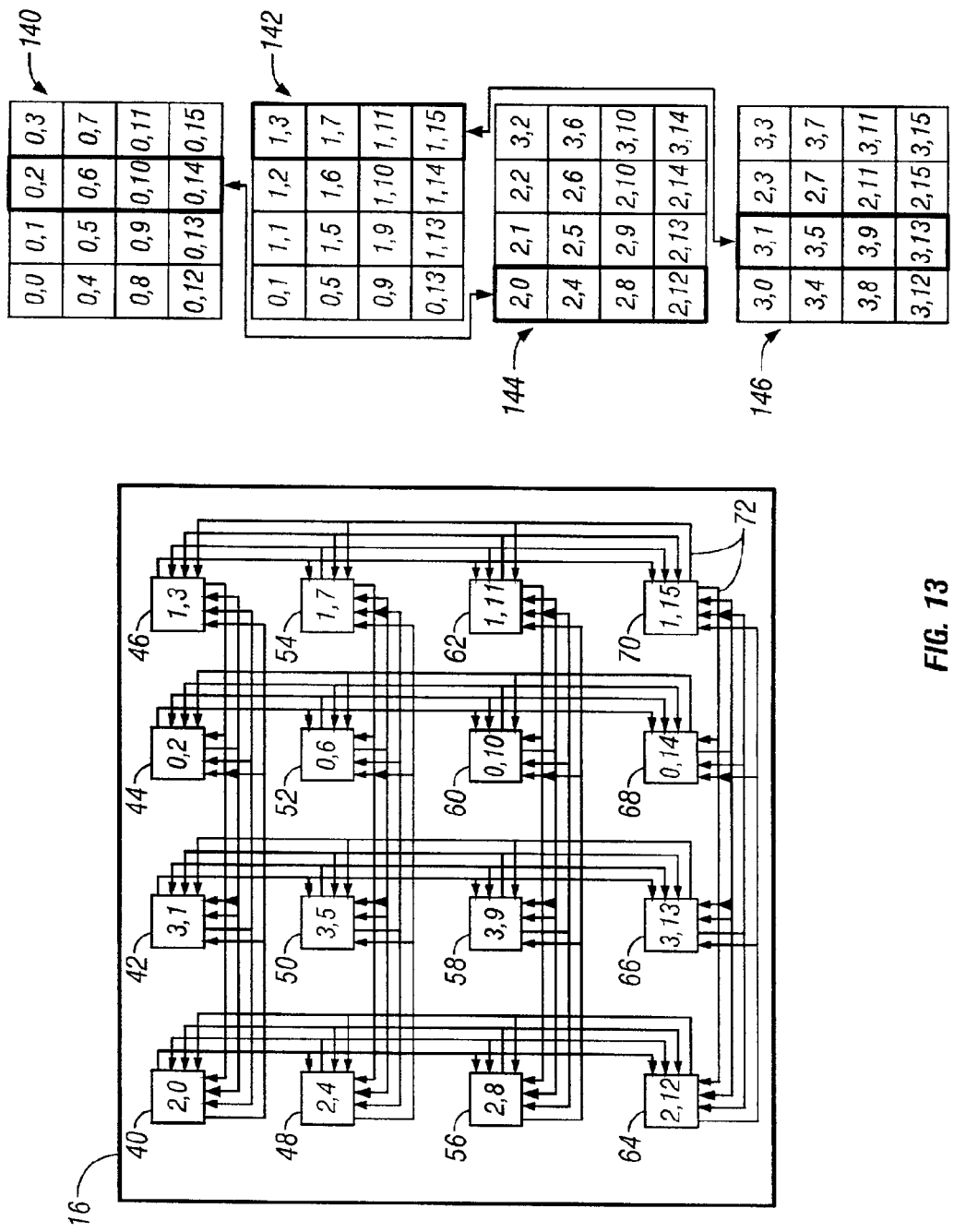
FIG. 13 shows step 2 of the block4v instruction.

FIG. 13 shows step 2 of the block4v instruction where the block4v operation swaps matrix register 140, column 2 with matrix register 144, column 0; and matrix register 142, column 3 with matrix register 146, column 1. This is performed by simultaneously having the column 0 elements of the matrix processor 16 broadcast their corresponding values from matrix register 144, column 1 elements broadcast from matrix register 146, column 2 elements broadcast from matrix register 140, and column 3 elements broadcast from matrix register 142. Then the column 0 elements read values from the column 2 broadcast port and write to matrix register 140, column 1 elements read values from the column 3 broadcast port and write to matrix register 142, column 2 elements read values from the column 0 broadcast port and write to matrix register 144, and column 3 elements read values from the column 1 broadcast port and write to matrix register 146.

Figure 14:
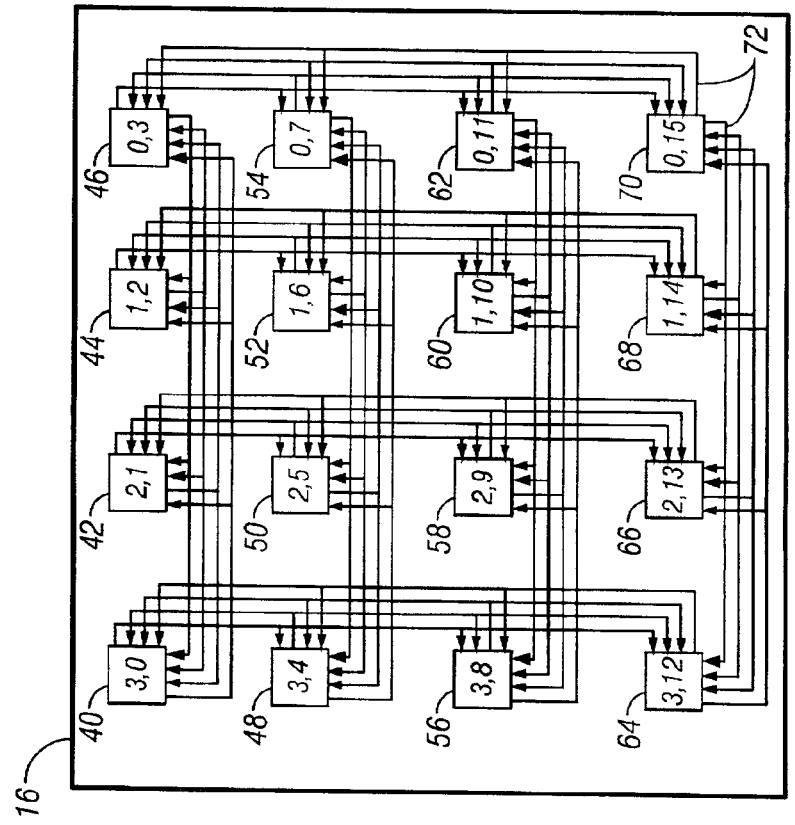
FIG. 14 shows step 3 of the block4v instruction.

FIG. 14 shows step 3 of the block4v instruction where the block4v operation swaps matrix register 140, column 3 with matrix register 146, column 0; and matrix register 142, column 2 with matrix register 144, column 1. This is performed by simultaneously having the column 0 elements of the matrix processor 16 broadcast their corresponding values from matrix register 146, column 1 elements broadcast from matrix register 144, column 2 elements broadcast from matrix register 142, and column 3 elements broadcast from matrix register 140. Then the column 0 elements read values from the column 3 broadcast port and write to matrix register 140, column 1 elements read values from the column 2 broadcast port and write to matrix register 142, column 2 elements read values from the column 1 broadcast port and write to matrix register 144, and column 3 elements read values from the column 0 broadcast port and write to matrix register 146.

Figure 15:
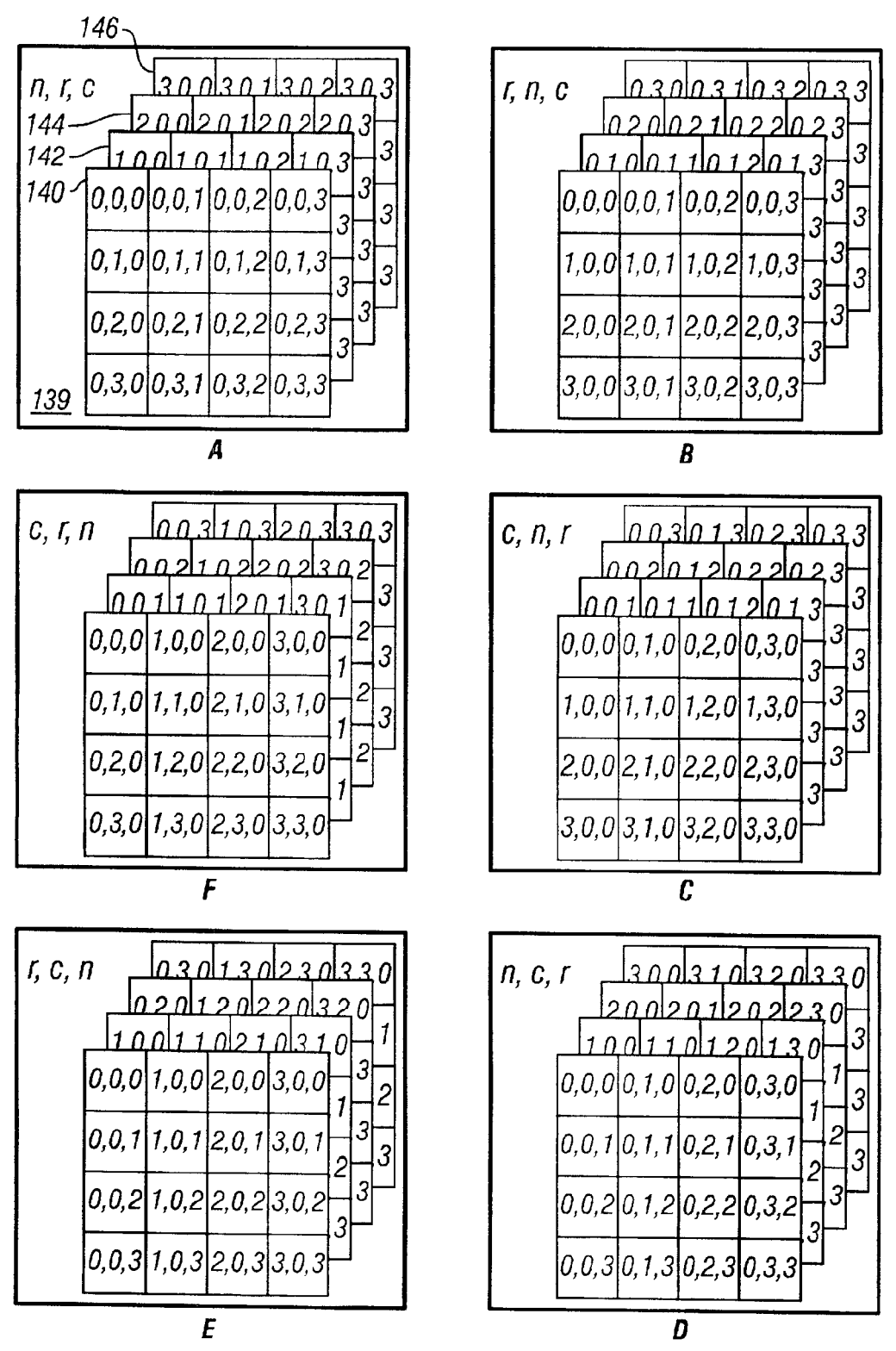

FIG. 15 illustrates the manipulation of matrix data performed by one or more instructions/operations of this invention. The block4 and block4v operations are orthogonal, and can be combined to perform a 16-way interleave on individual elements. This combined interleave can be used to collect corresponding data from 16 independent iterations of the same computation into the same matrix register, to allow parallel computation of algorithms that would otherwise have sequential data dependencies and not be able to take advantage of SIMD data parallel operation. Additionally, the block4/block4v instructions exploits parallelism in the data. By performing 2 or 3 successive operations with a combination of the block4/block4v instructions, one can get the standard matrix operations, deal, shuffle, and transpose. These standard operations operate in a 2D environment. However, the matrix processor as illustrated by the 4×4×4 array 139 (which visual represents the matrix registers of the matrix unit) extends those operations from 2D to 3D matrix operations. Thus, the block4/block4v instructions can be thought of as tensor matrix operations (3D matrix operations).

FIG. 15 illustrates another way to view the block4 and block4v operations by illustrating that the instructions are swapping indices. If one takes the 4 matrix registers, 140, 142, 144, and 146, then one would have a 4×4×4 array 139 of elements (register/index, row, column). Given that the block4, block4v, and transpose operations can be viewed as swapping two of the 3 indices, these operations would then produce the following results:

| block4: | (register/index, row, column) | -> | (row, register/index, column) |
|---|---|---|---|
| block4v: | (register/index, row, column) | -> | (column, row, register/index) |
| transpose: | (register/index, row, column) | -> | (register/index, column, row). |

Referring back to FIG. 15, data view A illustrates the beginning location of data in the array 139 that comprises each of the matrix registers 140, 142, 144, and 146. The legend (n, r, c) in each data view represents the (n-register/index, r-row, c-column) discussion above. This figure illustrates the application of the block4/block4v instructions in a circular or wheel manner, thus moving in a clockwise fashion from data view A to data view B illustrates the operation of the block4 instruction. Moving from data view B to data view C illustrates the operation of the block4v instruction. The application of the block4 instruction followed by the block4v instructions produces the "deal" operation, which here is a tensor matrix operation. Moving from data view C to data view D illustrates the operation of the block4 instruction. The application of the following instructions block4/block4v/block4 produces the "transpose" operation, another tensor matrix operation. Moving from data view D to data view E illustrates the application of a block4v instruction, which also produces the "shuffle" operation. Moving from data view E to data view F illustrates the operation of the block4 instruction. And finally, moving from data view F to data view A illustrates the block4v instruction.

Again referring to FIG. 15 and moving in a counter clockwise circular or wheel manner from data view A to F illustrates a block4v instruction. Moving from data view F to E illustrates a block4 instruction. This shows that the application of the following instructions block4v/block4 produces the "shuffle" operation. Moving from data view E to D illustrates the operation of the block4v instruction, which also produces the "transpose" operation. Moving from data view D to C illustrates the operation of the block4 instruction, which also produces the "deal" operation. Moving from C to B illustrates the operation of the block4v instruction. And finally, moving from B to A illustrates the operation of the block4 instruction.

Figure 16A:
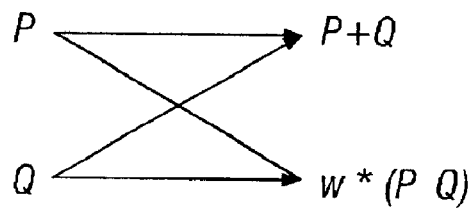
FIGS. 16A and 16B illustrates the manipulation of matrix data when performing a Fast Fourier Transform.
Figure 16B:
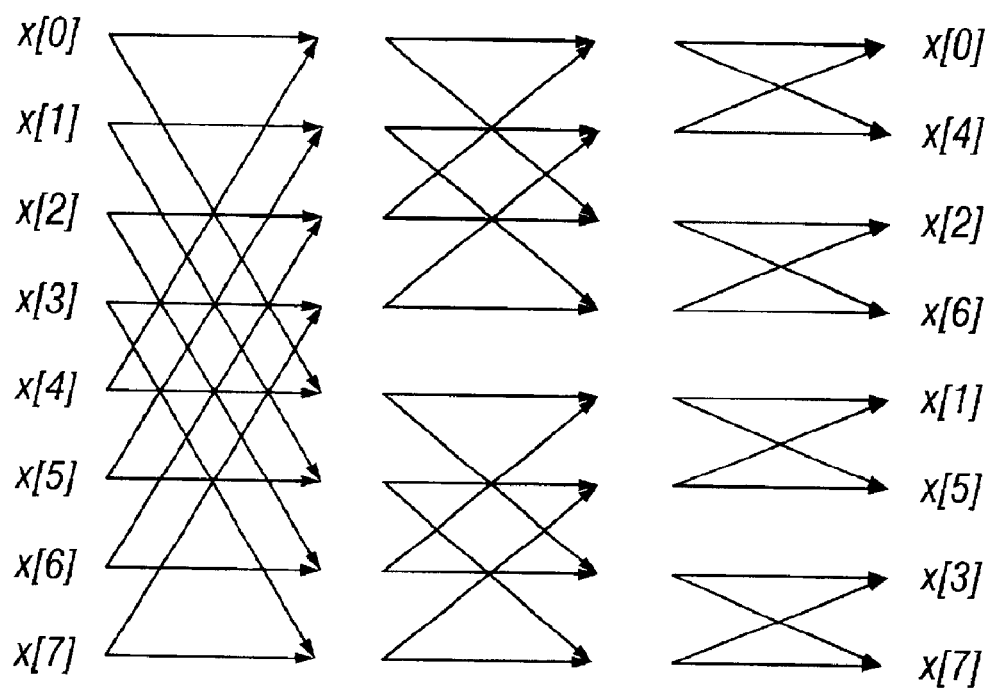

FIGS. 16A and 16B illustrates the manipulation of matrix data using this invention when performing a Fast Fourier Transform (FFT) such as a Radix2 "Decimation in Frequency" FFT with 16-bit complex (interleaved real/ imaginary) data. The FFT is an operation that converts data between time-domain and frequency-domain and is used in many frequency analysis applications. The FFT takes an incoming vector of data and sends it through a series of "butterfly" stages as illustrated in FIG. 16A. In this figure, P is the interleaved real component and Q is imaginary component of the data. Complex addition of the data is represented by P+Q, while complex multiplication and subtraction is represented by w*(P Q) where w is the "twist" or "twiddle" factor. FIG. 16B illustrates the application of $\log_2 N$ stages of the above FFT butterfly stages.

At the end of the FFT operation, the data is correct, but in the wrong location. The address of each data element is bit-reversed from the address it should be at as is illustrated by the following:

| | | |
|---|---|---|
| 000 | <-> | 000 |
| 001 | <-> | 100 |
| 010 | <-> | 010 |
| 011 | <-> | 110 |

These values need to be swapped in-place to complete the FFT operation. This swapping values in place turns out to be similar to the operation of the block4/block4v instructions. For example, if one performs a 64-element FFT, the final results of the FFT prior to address bit-reversal are held in 4 matrix registers (each holding 16 values). If one labels these values in their bit-reversed address sense, then one has:

| matrix 0 | matrix 1 | matrix 2 | matrix 3 |
|---|---|---|---|
| 00 32 16 48 | 02 34 18 50 | 01 33 17 49 | 03 35 19 51 |
| 08 40 24 56 | 10 42 26 58 | 09 41 25 57 | 11 43 27 59 |
| 04 36 20 52 | 06 38 22 54 | 05 37 21 53 | 07 39 23 55 |
| 12 44 28 60 | 14 46 30 62 | 13 45 29 61 | 15 47 31 63 |

First, one swaps matrices 2 and 1 (just by swapping the matrix registers):

| matrix 0 | matrix 1 | matrix 2 | matrix 3 |
|---|---|---|---|
| 00 32 16 48 | 01 33 17 49 | 02 34 18 50 | 03 35 19 51 |
| 08 40 24 56 | 09 41 25 57 | 10 42 26 58 | 11 43 27 59 |
| 04 36 20 52 | 05 37 21 53 | 06 38 22 54 | 07 39 23 55 |
| 12 44 28 60 | 13 45 29 61 | 14 46 30 62 | 15 47 31 63 |

Followed by a block4v operation:

| matrix 0 | matrix 1 | matrix 2 | matrix 3 |
|---|---|---|---|
| 00 01 02 03 | 32 33 34 35 | 16 17 18 19 | 48 49 50 51 |
| 08 09 10 11 | 40 41 42 43 | 24 25 26 27 | 56 57 58 59 |
| 04 05 06 07 | 36 37 38 39 | 20 21 22 23 | 52 53 54 55 |
| 12 13 14 15 | 44 45 46 47 | 28 29 30 31 | 60 61 62 63 |

Now all one needs to do is swap the middle two rows in each matrix register (performed with a selectcol instruction found in the FASTMATH microprocessor) and swap matrix registers 1 and 2 again, which has everything in place for producing the final answer.

The matrix processor is good at performing the same operation on a contiguous set of data ("data level parallelism"). However, some algorithms do not have much data level parallelism, but have a higher-order operation parallelism. One example is the Discrete Cosine Transform (DCT) used in video encoding/decoding, where there are a number of operations between elements of an 8×8 "macroblock." The matrix processor does not handle a single DCT efficiently, because there are not data-level parallel operations. However, if one takes the data from 16 independent DCT calculations and rearrange them using block4 and block4v instructions (the "deal" operation on the wheel in FIG. 15), then one winds up with a set of matrix register values where each matrix register holds the corresponding value from 16 independent DCT calculations. The above technique allows the matrix unit to process all of the independent DCT calculations in parallel, thus taking advantage of efficiencies of the matrix unit.

Here is another example of the efficiencies of the matrix unit used in conjunction with the block4/block4v instructions. Suppose, for example, that one wanted to add up the 4 columns in each matrix of 4 matrix registers using the data in the following matrices:

| matrix 0 | matrix 1 | matrix 2 | matrix 3 |
|---|---|---|---|
| 00 01 02 03 | 16 17 18 19 | 32 33 34 35 | 48 49 50 51 |
| 04 05 06 07 | 20 21 22 23 | 36 37 38 39 | 52 53 54 55 |
| 08 09 10 11 | 24 25 26 27 | 40 41 42 43 | 56 57 58 59 |
| 12 13 14 15 | 28 29 30 31 | 44 45 46 47 | 60 61 62 63 |

So the resulting first element in matrix 0 would be 00+04+08+12, the second would be 01+05+09+13, etc.

When using the matrix processor, one could perform a "sumcol" instruction on each of the 4 matrix registers. Unfortunately, each sumcol instruction takes 4 cycles to perform and wastes computation cycles since not all of the 16 elements are doing useful work. Solving the example in this way would take 16 clock cycles to perform the entire operation. Instead, one can rearrange the 4 matrix registers with a block4 instruction, which interleaves the rows. This has the effect of spreading out each column in each matrix register among the 4 matrix registers as illustrated below:

| matrix 0 | matrix 1 | matrix 2 | matrix 3 |
|---|---|---|---|
| 00 01 02 03 | 04 05 06 07 | 08 09 10 11 | 12 13 14 15 |
| 16 17 18 19 | 20 21 22 23 | 24 25 26 27 | 28 29 30 31 |
| 32 33 34 35 | 36 37 38 39 | 40 41 42 43 | 44 45 46 47 |
| 48 49 50 51 | 52 53 54 55 | 56 57 58 59 | 60 61 62 63 |

Now one can perform 3 single-cycle matrix adds with the following matrix add instructions:

add.m $m4, $m0, $m1 add.m $m4, $m4, $m2 add.m $m4, $m4, $m3

With each of these add operations, the matrix processor is performing 16 element-wise additions on two matrix registers, so each matrix element is performing useful work. This technique transforms operation-level parallelism (summing the columns on each of the 4 matrix registers) into data-level parallelism so that the matrix processing abilities can be exploited in the matrix processor.

Proceeding further with the above example, matrix register 4 now holds the set of 16 column sums (4 column sums from each of the 4 matrices). If needed, one could redistribute the sums back to the correct corresponding registers by again performing a block4 instruction, "undoing" the effect of the first block4. This version of the computation only takes 9 cycles, as opposed to the 16 required by the 4 sumcol instructions in the matrix processor.

Another application of the block4/block4v instruction is in address reversal by using the repetitive applications of these instructions. A radix-4 bit reversal can be accomplished by multiple use of the block4 instruction while selectively offsetting the target address of each use of the instruction and combining the multiple use of the block4 instruction with multiple use of the block4v instruction while selectively offsetting the target address of the each use of the instruction.

To summarize, this invention discloses a group of instructions, block4 and block4v, in a matrix processor 16 that rearanges data between vector and matrix forms of an A×B matrix of data 120 where the data matrix includes one or more 4×4 sub-matrices of data 160–166. The matrix processor 16 comprises 16 processing elements 40–70 where an individual processing element (PE) 80 comprises 16 PE register entries M0–M15 in a PE register file 96. A mesh row column interconnect 72 couples the processing elements into a 4×4 matrix processing array. The matrix processor 16 includes 16 matrix registers, and includes a group of those matrix registers, the first 140, second 142, third 144, and fourth 146 matrix register for matrix operations. An individual matrix register is a combination of register entries that includes an individual PE register entry from each PE register file from each individual processing element in the matrix processor that are then combined together.

The block4 and block4v instructions of this invention simultaneously swaps row or columns between a group of matrix registers that includes a first 140, second 142, third 144, and fourth 146 matrix register according to the instructions that perform predefined matrix tensor operations on the data matrix that includes one of the following group of operations: swapping rows between the different individual matrix registers of the group, or swapping columns between the different individual matrix registers of the group. Additionally, the swapping of rows or columns converts the data in the data matrix into one of the following matrix data orders: 4 vectors of the larger data matrix to a 4×4 data sub-matrix in row major order, and 4 vectors of the larger data matrix to a 4×4 data sub-matrix in column major order. And finally, successive iterations or combinations of the block4 and or block4v instructions perform standard tensor matrix operations from the following group of matrix operations: transpose, shuffle, and deal.

Other embodiments of the invention will be apparent to those skilled in the art after considering this specification or practicing the disclosed invention. The specification and examples above are exemplary only, with the true scope of the invention being indicated by the following claims.

We claim the following invention:

1. A group of instructions in a Matrix Processor that rearranges data between vector and matrix forms of an A×B matrix of data where the data matrix includes one or more 4×4 sub-matrices of data, comprising:

16 processing elements where an individual processing element (PE) comprises one or more PE register entries in a PE register file;

a mesh row column interconnect that couples said processing elements into a 4×4 matrix processing array;

a first, second, third, and fourth matrix register wherein an individual matrix register comprises an individual PE register entry from each said PE register file from each said individual processing element that are then combined together to from said individual matrix register;

wherein said first, second, third, and fourth matrix registers simultaneously swaps row or columns between said first, second, third, and fourth matrix registers according to the instructions that perform predefined matrix tensor operations on the data matrix that includes one of the following group of operations: swapping rows between said first, second, third, and fourth matrix registers, or swapping columns between said first, second, third, and fourth matrix registers.

2. A Matrix Processor that includes instructions that rearranges data between vector and matrix forms of an A×B matrix of data where the data matrix includes one or more 4×4 sub-matrices of data, comprising:

16 processing elements where an individual processing element (PE) comprises one or more PE register entries in a PE register file;

a mesh row column interconnect that couples said processing elements into a 4×4 matrix processing array;

a first, second, third, and fourth matrix register wherein an individual matrix register comprises an individual PE register entry from each said PE register file from each said individual processing element that are then combined together to from said individual matrix register;

wherein said first, second, third, and fourth matrix registers simultaneously swaps row or columns between said first, second, third, and fourth matrix registers according to the instructions that perform predefined matrix tensor operations on the data matrix that includes one of the following group of operations: swapping rows between said first, second, third, and fourth matrix registers, or swapping columns between said first, second, third, and fourth matrix registers.

3. A system that includes a Matrix Processor with instructions that rearranges data between vector and matrix forms of an A×B matrix of data where the data matrix includes one or more 4×4 sub-matrices of data, comprising:

16 processing elements where an individual processing element (PE) comprises one or more PE register entries in a PE register file;

a mesh row column interconnect that couples said processing elements into a 4×4 matrix processing array;

a first, second, third, and fourth matrix register wherein an individual matrix register comprises an individual PE register entry from each said PE register file from each said individual processing element that are then combined together to from said individual matrix register;

wherein said first, second, third, and fourth matrix registers simultaneously swaps row or columns between different said first, second, third, and fourth registers according to the instructions that perform predefined matrix tensor operations on the data matrix that includes one of the following group of operations: swapping rows between said first, second, third, and fourth matrix registers, or swapping columns between said first, second, third, and fourth matrix registers.

4. A method to make a Matrix Processor that includes instructions that rearranges data between vector and matrix forms of an A×B matrix of data where the data matrix includes one or more 4×4 sub-matrices of data, comprising:

providing 16 processing elements where an individual processing element (PE) comprises one or more PE register entries in a PE register file;

coupling said processing elements into a 4×4 matrix processing array with a mesh row column interconnect;

providing a first, second, third, and fourth matrix register wherein an individual matrix register comprises an individual PE register entry from each said PE register file from each said individual processing element that are then combined together to from said individual matrix register;

wherein said first, second, third, and fourth matrix registers simultaneously swaps row or columns between said first, second, third, and fourth matrix registers according to the instructions that perform predefined matrix tensor operations on the data matrix that includes one of the following group of operations: swapping rows between said first, second, third, and fourth matrix registers, or swapping columns between said first, second, third, and fourth matrix registers.

5. A method to use instructions in a Matrix Processor that rearranges data between vector and matrix forms of an A×B matrix of data where the data matrix includes one or more 4×4 sub-matrices of data, comprising:

providing 16 processing elements where an individual processing element (PE) comprises one or more PE register entries in a PE register file;

providing a mesh row column interconnect that couples said processing elements into a 4×4 matrix processing array;

providing a first, second, third, and fourth matrix register wherein an individual matrix register comprises an individual PE register entry from each said PE register file from each said individual processing element that are then combined together to from said individual matrix register; and simultaneously swapping row or columns between said first, second, third, and fourth matrix registers according to the instructions that perform predefined matrix tensor operations on the data matrix that includes one of the following group of operations: swapping rows between said first, second, third, and fourth matrix registers, or swapping columns between said first, second, third, and fourth matrix registers.

6. A dependent claim according to claim 1, 2, 3, 4, or 5 wherein successive iterations or combinations of the instructions perform standard tensor matrix operations from the following group of matrix operations: transpose, shuffle, and deal.

7. A dependent claim according to claim 1, 2, 3, 4, or 5 wherein the swapping of rows or columns converts the data in the data matrix into one of the following matrix data orders: 4 vectors of the larger data matrix to a 4×4 data sub-matrix in row major order, and 4 vectors of the larger data matrix to a 4×4 data sub-matrix in column major order.

8. A group of instructions in a Matrix Processor that rearranges data between vector and matrix forms of an A×B matrix of data where the data matrix includes one or more 4×4 sub-matrices of data, comprising:

16 processing elements where an individual processing element (PE) comprises 16 PE register entries in a PE register file;

a mesh row column interconnect that couples said processing elements into a 4×4 matrix processing array;

16 matrix registers wherein an individual matrix register comprises an individual PE register entry from each said PE register file from each said individual processing element that are then combined together to from said individual matrix register;

wherein a group of said 16 matrix registers comprises a first, second, third, and fourth matrix register of said 16 matrix registers that simultaneously swaps row or columns between said first, second, third, and fourth matrix registers of said group of matrix registers according to the instructions that perform predefined matrix tensor operations on the data matrix that includes one of the following group of operations: swapping rows between said first, second, third, and fourth matrix register of said group of matrix registers, or swapping columns between said first, second, third, and fourth matrix register of said group of matrix registers; and wherein the swapping of rows or columns converts the data in the data matrix into one of the following matrix data orders: 4 vectors of the larger data matrix to a 4×4 data sub-matrix in row major order, and 4 vectors of the larger data matrix to a 4×4 data sub-matrix in column major order.

9. A Matrix Processor that includes instructions that rearranges data between vector and matrix forms of an A×B matrix of data where the data matrix includes one or more 4×4 sub-matrices of data, comprising:

16 processing elements where an individual processing element (PE) comprises one or more PE register entries in a PE register file;

a mesh row column interconnect that couples said processing elements into a 4×4 matrix processing array;

16 matrix registers wherein an individual matrix register comprises an individual PE register entry from each said PE register file from each said individual processing element that are then combined together to from said individual matrix register;

wherein a group of said 16 matrix registers comprises a first, second, third, and fourth matrix register of said 16 matrix registers that simultaneously swaps row or columns between said first, second, third, and fourth matrix register of said group of matrix registers according to the instructions that perform predefined matrix tensor operations on the data matrix that includes one of the following group of operations: swapping rows between said first, second, third, and fourth matrix register of said group of matrix registers, or swapping columns between said first, second, third, and fourth matrix register of said group of matrix registers; and wherein the swapping of rows or columns converts the data in the data matrix into one of the following matrix data orders: 4 vectors of the larger data matrix to a 4×4 data sub-matrix in row major order, and 4 vectors of the larger data matrix to a 4×4 data sub-matrix in column major order.

10. A system that includes a Matrix Processor with instructions that rearranges data between vector and matrix forms of an A×B matrix of data where the data matrix includes one or more 4×4 sub-matrices of data, comprising:

16 processing elements where an individual processing element (PE) comprises one or more PE register entries in a PE register file;

a mesh row column interconnect that couples said processing elements into a 4×4 matrix processing array;

16 matrix registers wherein an individual matrix register comprises an individual PE register entry from each said PE register file from each said individual processing element that are then combined together to from said individual matrix register;

wherein a group of said 16 matrix registers comprises a first, second, third, and fourth matrix register that simultaneously swaps row or columns between said first, second, third, and fourth matrix register of said group of matrix registers according to the instructions that perform predefined matrix tensor operations on the data matrix that includes one of the following group of operations: swapping rows between said first, second, third, and fourth matrix register of said group of matrix registers, or swapping columns between said first, second, third, and fourth matrix register of said group of matrix registers; and wherein the swapping of rows or columns converts the data in the data matrix into one of the following matrix data orders: 4 vectors of the larger data matrix to a 4×4 data sub-matrix in row major order, and 4 vectors of the larger data matrix to a 4×4 data sub-matrix in column major order.

11. A method to make a Matrix Processor that includes instructions that rearranges data between vector and matrix forms of an A×B matrix of data where the data matrix includes one or more 4×4 sub-matrices of data, comprising:

providing 16 processing elements where an individual processing element (PE) comprises one or more PE register entries in a PE register file;

coupling said processing elements into a 4×4 matrix processing array with a mesh row column interconnect;

providing 16 matrix registers wherein an individual matrix register comprises an individual PE register entry from each said PE register file from each said individual processing element that are then combined together to from said individual matrix register;

wherein a group of said 16 matrix registers comprises a first, second, third, and fourth matrix register that simultaneously swaps row or columns between said first, second, third, and fourth matrix register of said group of matrix registers according to the instructions that perform predefined matrix tensor operations on the data matrix that includes one of the following group of operations: swapping rows between said first, second, third, and fourth matrix register of said group of matrix registers, or swapping columns between said first, second, third, and fourth matrix register of said group of matrix registers; and wherein the swapping of rows or columns converts the data in the data matrix into one of the following matrix data orders: 4 vectors of the larger data matrix to a 4×4 data sub-matrix in row major order, and 4 vectors of the larger data matrix to a 4×4 data sub-matrix in column major order.

12. A method to use instructions in a Matrix Processor that rearranges data between vector and matrix forms of an A×B matrix of data where the data matrix includes one or more 4×4 sub-matrices of data, comprising:

providing 16 processing elements where an individual processing element (PE) comprises one or more PE register entries in a PE register file;

providing a mesh row column interconnect that couples said processing elements into a 4×4 matrix processing array;

providing 16 matrix registers wherein an individual matrix register comprises an individual PE register entry from each said PE register file from each said individual processing element that are then combined together to from said individual matrix register; and simultaneously swapping row or columns between a group of said 16 matrix registers that comprise a first, second, third, and fourth matrix register according to the instructions that perform predefined matrix tensor operations on the data matrix that includes one of the following group of operations: swapping rows between said first, second, third, and fourth matrix register of said group of matrix registers, or swapping columns between said first, second, third, and fourth matrix register of said group of matrix registers;

wherein the swapping of rows or columns converts the data in the data matrix into one of the following matrix data orders: 4 vectors of the larger data matrix to a 4×4 data sub-matrix in row major order, and 4 vectors of the larger data matrix to a 4×4 data sub-matrix in column major order.

13. A dependent claim according to claim 8, 9, 10, 11, or 12 wherein successive iterations or combinations of the instructions perform standard tensor matrix operations from the following group of matrix operations: transpose, shuffle, and deal.

* * * * *

UNITED STATES PATENT AND TRADEMARK OFFICE
CERTIFICATE OF CORRECTION

| | | |
|---|---|---|
| PATENT NO. | : 6,898,691 B2 | Page 1 of 1 |
| APPLICATION NO. | : 10/164040 | |
| DATED | : May 24, 2005 | |
| INVENTOR(S) | : James S. Blomgren et al. | |

It is certified that error appears in the above-identified patent and that said Letters Patent is hereby corrected as shown below:

On the Title Page, in item (56), under (Other Publications), in column 2, line 5, delete "Moderatly" and insert -- Moderately --, therefor.

On the Title Page, in item (56), under (Other Publications), in column 2, line 13, delete "Kuradhi," and insert -- Kurdahi, --, therefor.

In column 2, line 11, delete "block" and insert -- block4 --, therefor.

In column 2, line 22, delete "160-166" and insert -- 160-166. --, therefor.

In column 3, line 47, delete "160-166" and insert -- 160-166. --, therefor.

In column 5, line 41, delete "accumlators," and insert -- accumulators, --, therefor.

In column 6, line 32, delete "This to" and insert -- This --, therefor.

In column 11, line 44, delete "rearanges" and insert -- rearranges --, therefor.

Signed and Sealed this
Twenty-ninth Day of November, 2011

David J. Kappos
*Director of the United States Patent and Trademark Office*